(12) United States Patent
Thompson et al.

(10) Patent No.: US 12,276,438 B2
(45) Date of Patent: *Apr. 15, 2025

(54) BUILDING RIDGE VENT SYSTEM

(71) Applicant: American Flashings and Accessories, LLC, Bailey, MI (US)

(72) Inventors: Leon W. Thompson, Kent City, MI (US); Jacob M. Thompson, Grant, MI (US)

(73) Assignee: American Flashings and Accessories, LLC, Bailey, MI (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/086,129

(22) Filed: Dec. 21, 2022

(65) Prior Publication Data

US 2023/0126169 A1    Apr. 27, 2023

Related U.S. Application Data

(63) Continuation-in-part of application No. 17/683,814, filed on Mar. 1, 2022, now Pat. No. 11,965,339, which is a continuation of application No. 29/817,795, filed on Dec. 3, 2021, now Pat. No. Des. 1,037,495.

(60) Provisional application No. 63/162,646, filed on Mar. 18, 2021.

(51) Int. Cl.
| | |
|---|---|
| *E04D 13/17* | (2006.01) |
| *B01D 46/54* | (2006.01) |
| *F24F 7/02* | (2006.01) |
| *F24F 13/28* | (2006.01) |

(52) U.S. Cl.
CPC .............. *F24F 7/02* (2013.01); *B01D 46/543* (2013.01); *F24F 13/28* (2013.01); *B01D 2279/35* (2013.01)

(58) Field of Classification Search
CPC ..... E04D 13/174; E04D 13/176; E04D 13/17; E04D 2001/309; F24F 7/02
USPC ............................ 52/199; 454/365, 366, 367
See application file for complete search history.

(56) References Cited

U.S. PATENT DOCUMENTS

| | | | | |
|---|---|---|---|---|
| 2,799,214 | A | * | 7/1957 | Roose .................... E04D 13/174 454/365 |
| 4,280,399 | A | * | 7/1981 | Cunning ............... E04D 13/174 454/365 |
| 4,554,862 | A | * | 11/1985 | Wolfert ..................... F24F 7/02 52/517 |
| 4,676,147 | A | * | 6/1987 | Mankowski .......... E04D 13/174 454/365 |

(Continued)

*Primary Examiner* — Kyle J. Walraed-Sullivan
(74) *Attorney, Agent, or Firm* — Warner Norcross + Judd LLP

(57) ABSTRACT

A ridge vent system is provided including a ridge vent having opposing exterior sidewalls that each define multiple fastener recesses that extend inward from the exterior sidewalls and downward from a top plate. The ridge vent can include ventilation elements within the exterior sidewalls and/or fastener recesses. The ridge vent can include an air permeable filter membrane that can be secured to bottom walls of the fastener recesses to impair environmental elements from entering a structure therethrough, yet still provide air flow out the vent. The ridge vent can be in sheet or roll form, depending on the application. The ridge vent can provide enhanced attic ventilation and/or airflow through the ridge vent, while still providing fastener recesses that facilitate rapid and efficient application of fasteners therethrough.

14 Claims, 15 Drawing Sheets

(56) References Cited

U.S. PATENT DOCUMENTS

| | | | | |
|---|---|---|---|---|
| 4,817,506 A * | 4/1989 | Cashman | E04D 13/174 | 454/365 |
| 4,903,445 A * | 2/1990 | Mankowski | F24F 7/02 | 454/365 |
| 4,957,037 A * | 9/1990 | Tubbesing | F24F 7/02 | 454/366 |
| 4,962,692 A * | 10/1990 | Shuert | E04D 13/174 | 454/365 |
| 5,052,286 A * | 10/1991 | Tubbesing | F24F 7/02 | 454/365 |
| 5,070,771 A * | 12/1991 | Mankowski | E04D 13/174 | 454/367 |
| 5,095,810 A * | 3/1992 | Robinson | F24F 7/02 | 454/366 |
| 5,122,095 A * | 6/1992 | Wolfert | F24F 7/02 | 454/365 |
| 5,149,301 A * | 9/1992 | Gates | E04D 13/174 | 454/365 |
| 5,797,222 A * | 8/1998 | Martin | E04D 13/174 | 454/365 |
| 6,128,869 A * | 10/2000 | Brotherton | F24F 7/02 | 52/302.1 |
| 6,227,963 B1 * | 5/2001 | Headrick | E04D 13/174 | 454/365 |
| 6,233,887 B1 | 5/2001 | Smith | | |
| 6,277,024 B1 * | 8/2001 | Coulton | F24F 7/02 | 454/365 |
| 6,793,574 B1 * | 9/2004 | Robinson | F24F 7/02 | 454/364 |
| 7,735,287 B2 * | 6/2010 | Gaudreau | E04D 3/365 | 52/525 |
| 8,157,628 B2 | 4/2012 | Villela et al. | | |
| 8,549,802 B2 * | 10/2013 | Thagard, III | B29C 44/02 | 52/275 |
| 9,175,480 B1 * | 11/2015 | Polston | E04D 13/174 | |
| 2002/0016150 A1 * | 2/2002 | Hansen | E04D 13/174 | 454/365 |
| 2002/0100232 A1 * | 8/2002 | Robinson | E04D 13/176 | 454/366 |
| 2002/0193065 A1 * | 12/2002 | Morris | E04D 13/176 | 454/365 |
| 2005/0054284 A1 * | 3/2005 | Ciepliski | E04D 13/176 | 454/365 |
| 2005/0136831 A1 * | 6/2005 | Coulton | F24F 7/02 | 454/365 |
| 2006/0154597 A1 * | 7/2006 | Coulton | F24F 7/02 | 454/365 |
| 2006/0196130 A1 * | 9/2006 | Mantyla | E04D 13/174 | 52/198 |
| 2006/0229010 A1 * | 10/2006 | Villela | F24F 7/02 | 454/365 |
| 2007/0039252 A1 * | 2/2007 | Railkar | E04D 13/002 | 52/44 |
| 2007/0072540 A1 * | 3/2007 | Ciepliski | E04D 13/174 | 454/365 |
| 2008/0064320 A1 * | 3/2008 | Polston | E04D 13/174 | 454/365 |
| 2008/0287053 A1 * | 11/2008 | Carlson | E04D 13/174 | 454/365 |
| 2008/0287054 A1 * | 11/2008 | Carlson | E04D 13/174 | 454/365 |
| 2009/0025316 A1 * | 1/2009 | Coulton | F24F 7/02 | 454/365 |
| 2009/0049769 A1 * | 2/2009 | Kaseda | E04D 13/174 | 52/745.16 |
| 2011/0195655 A1 * | 8/2011 | Holland | E04D 13/174 | 454/365 |
| 2011/0302852 A1 * | 12/2011 | Grubka | E04D 1/30 | 52/302.1 |
| 2013/0074428 A1 * | 3/2013 | Allen | E04D 13/174 | 52/302.1 |
| 2014/0273808 A1 * | 9/2014 | Mankowski | E04D 13/176 | 454/365 |
| 2014/0308891 A1 * | 10/2014 | Holland | E04D 13/174 | 454/365 |
| 2016/0201332 A1 * | 7/2016 | Fiser | E04D 13/174 | 454/365 |
| 2016/0215500 A1 * | 7/2016 | Van Noort | E04D 13/174 | |
| 2016/0333574 A1 * | 11/2016 | Grubka | E04B 7/022 | |
| 2016/0369513 A1 * | 12/2016 | Van Wey | F24F 7/02 | |
| 2017/0321933 A1 * | 11/2017 | Kvasnicka | E04F 13/18 | |
| 2017/0350127 A1 * | 12/2017 | Lowe | E04D 13/174 | |
| 2019/0136537 A1 | 5/2019 | Henning | | |
| 2019/0249440 A1 * | 8/2019 | Hendricks, Jr. | E04D 13/174 | |
| 2020/0018071 A1 * | 1/2020 | Holland | E04D 13/174 | |
| 2020/0240148 A1 * | 7/2020 | Van Wey | E04D 1/36 | |
| 2022/0298798 A1 * | 9/2022 | Thompson | E04D 13/174 | |
| 2023/0126169 A1 * | 4/2023 | Thompson | F24F 7/02 | 52/199 |
| 2023/0130279 A1 * | 4/2023 | Thompson | E04D 13/174 | 454/365 |
| 2023/0228092 A1 * | 7/2023 | Robida | E04D 13/17 | 454/365 |
| 2023/0313533 A1 * | 10/2023 | Vega-Gutierrez | E04D 3/361 | 52/58 |
| 2023/0358051 A1 * | 11/2023 | Railkar | E04D 13/172 | |

* cited by examiner

BUILDING RIDGE VENT SYSTEM

BACKGROUND OF THE INVENTION

The present invention relates to vents, and more particularly to a roof ridge vent system that ventilates a roof of a building.

Many building roofs are outfitted with vents to promote ventilation and evacuate heat and moisture from the upper extremities of buildings. A common type of vent for building roofs is a ridge vent, which is installed over an opening, typically defined at the peak or ridge of a roof, where two roof surfaces come together. Such ridge vents usually are installed end to end along a length of a ridge of a roof. These ridge vents also are nailed down to the roof with nails to hold them securely in place for a long time.

For many years, ridge vents have been installed using a hammer to manually drive the nails, however, recent advancements in ridge vents have allowed installers of ridge vents to install "sticks" or sections of ridge vents with a nail gun. An example of such a ridge vent that is installable with a nail gun is shown in U.S. Patent Application 2019/0136537 to Henning, which is hereby incorporated by reference in its entirety. This reference uses a series of ports along edges of a ridge vent that have a shape that permits access by the head of a nail gun so that the ridge vent can be installed using the nail gun, which drives a nail through each of the ports. While this design is helpful, it negates the efficiency of such ridge vents with the positioning of the ports, and their obstruction of airflow venting. Indeed, the amount of airflow provided by such a ridge vent can be decreased by up to 10% or more in some cases over conventional ridge vents without the nail gun ports. This restriction can present a significant issue, particularly where the ridge vent is installed on a building within a municipality having building codes that mandate a particular amount of airflow through the ridge vent from attic space under the roof. With the decreased airflow, in some cases, the ridge vents might not pass code, in which case the ridge vents may need to be removed or modified at a great expense and effort to the installer, builder and/or owner.

Accordingly, there remains room for improvement in the field of venting for roofs, and in particular ridge vent systems.

SUMMARY OF THE INVENTION

A ridge vent system is provided including a ridge vent having opposing exterior sidewalls that each define multiple fastener recesses that extend inward from the exterior sidewalls and downward from a top plate. The ridge vent can provide attic ventilation and/or airflow through the ridge vent, while still providing fastener recesses that facilitate rapid and efficient application of fasteners therethrough to install the ridge vent relative to a roof.

In one embodiment, each fastener recess can have multiple recess venting slots that cooperate with adjacent sidewall venting slots to form contiguous vented areas along each of the opposing exterior sidewalls. This can further enhance attic ventilation and/or air flow through the ridge vent.

In another embodiment, the ridge vent can include a body including a top plate extending from a first side toward a second side. The top plate can include a first top plate side, a second top plate side and a bending region between the sides. This bending region can overlap a longitudinal axis of the body; and can allow the first and second top plate sides to move and change an angular orientation relative to one another, to thereby accommodate adjacent roof surfaces at a peak or ridge of a roof.

In even another embodiment, each recess that accommodates a fastener can be bounded by a nailing flange or bottom wall and a recess wall extending from the bottom wall to the top plate. This recess wall can define multiple air venting slots between the bottom wall and the top plate. These slots can be located between sets of sidewall slots defined by a sidewall, with the air venting slots and the sidewall venting slots providing a contiguous vented area along the respective sidewall and the recess walls of each recess.

In still another embodiment, multiple contiguous vented areas of multiple ridge vents placed over an opening in a roof surface provide an attic ventilation area. This system of ridge vents can thus provide ventilation to a building at a minimum of at least 1 square foot of attic ventilation area for every 300 square feet of attic floor space.

In yet another embodiment, the ridge vent can include a lip extending away from the exterior sidewall. An end wall can extend upward from the first lip, opposite the multiple sidewall slots. The end wall and/or the lip can define multiple drain holes intermittently disposed along the end wall and/or the lip. These drain holes can allow liquid to efficiently drain from the ridge vent.

In even another embodiment, drain holes can be disposed directly in front of and/or aligned with each of the fastener recesses to prevent or impair pooling of liquid in the fastener recesses.

In a further embodiment, each fastener recess can be configured to include a landing pad or target region having a thickness that is greater than other portions of the recess or ridge vent in general. For example, a target region can include a thickness greater than a remaining portion of the nailing flange or recess. The target region with increased thickness can withstand damage due to a fastener penetrating the nailing flange with force.

In still a further embodiment, the target region can be bounded by a perimeter. The perimeter can include an indicia element and/or a step that provides a visual que for a user to identify the location of the target region and advance a fastener through the target region rather than other portions of the fastener recess or nailing flange. The indicia can be a raised or recessed feature along the perimeter, optionally with alphanumeric characters indicating some instructions to the user.

In yet a further embodiment, the ridge vent can include an air permeable filter membrane that can be secured to bottom walls of the fastener recesses to impair environmental elements, for example precipitation, water, dust, debris, etc., from entering a structure therethrough, yet still provide air flow through the ridge vent.

In still yet a further embodiment, the filter membrane can be secured to the undersurfaces of the bottom walls of the fastener recesses to form a void between the top plate and the filter. The filter membrane can be secured by welding, melting, fusing, adhering, cementing, gluing, tacking and/or fastening it to the undersurfaces of the recess bottom walls.

In even a further embodiment, the ridge vent can be in sheets or rolls. In a rolled mode, the ridge vent can be rolled upon itself in layers in a spiral form. Where a filter membrane is provided, the membrane can lay against and engage a top plate of an adjacent layer in the rolled mode. The fastener recesses also can be visible from a side view of the roll in the rolled mode. The ridge vent can be rolled out in an unrolled form and installed relative to a roof ridge.

The current embodiments provide a ridge vent and system that can efficiently cap an opening in a roof at two adjoining roof surfaces, and efficiently allow transfer of air from and ventilation of an attic space under the roof and system. Where the ridge vent includes the fastener recesses, an installer can rapidly and quickly use an automated tool, such as a nail gun, screw gun and/or stapler to secure the ridge vent to the roof. The nailing flange or bottom wall of the recesses can directly engage the roof, and can be pinned against the roof surface with the fastener without collapsing the ridge vent air space around the recesses with that fastener. The system can allow easy and quick installation, as well as even fastener spacing when securing the ridge vent to the roof. The system also can enhance overall airflow from an attic space under the roof where the fastener recess walls themselves include airflow ventilation elements, for example, slots. These ventilation elements can further cooperate with airflow or venting elements in outer sidewalls of the body of the ridge vent, which otherwise would be interrupted by the fastener recesses, thereby decreasing the ventilation area of the ridge vents. Despite having high airflow characteristics, the ridge vent can be low profile, which can make it less likely to be torn, damaged or blown off a roof under high winds. When provided with a filter membrane, the ridge vent can be easily installed and the filter membrane can provide adequate air and vapor passage through the ridge vent out of the structure, yet block moisture, water, dust and debris from entering the structure through the filter membrane. When included, the filter membrane can be attached directly to the ridge vent to avoid having to deal with a separate element. Where the ridge vent is provided in roll form, it can be easily transported and installed.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 4A:
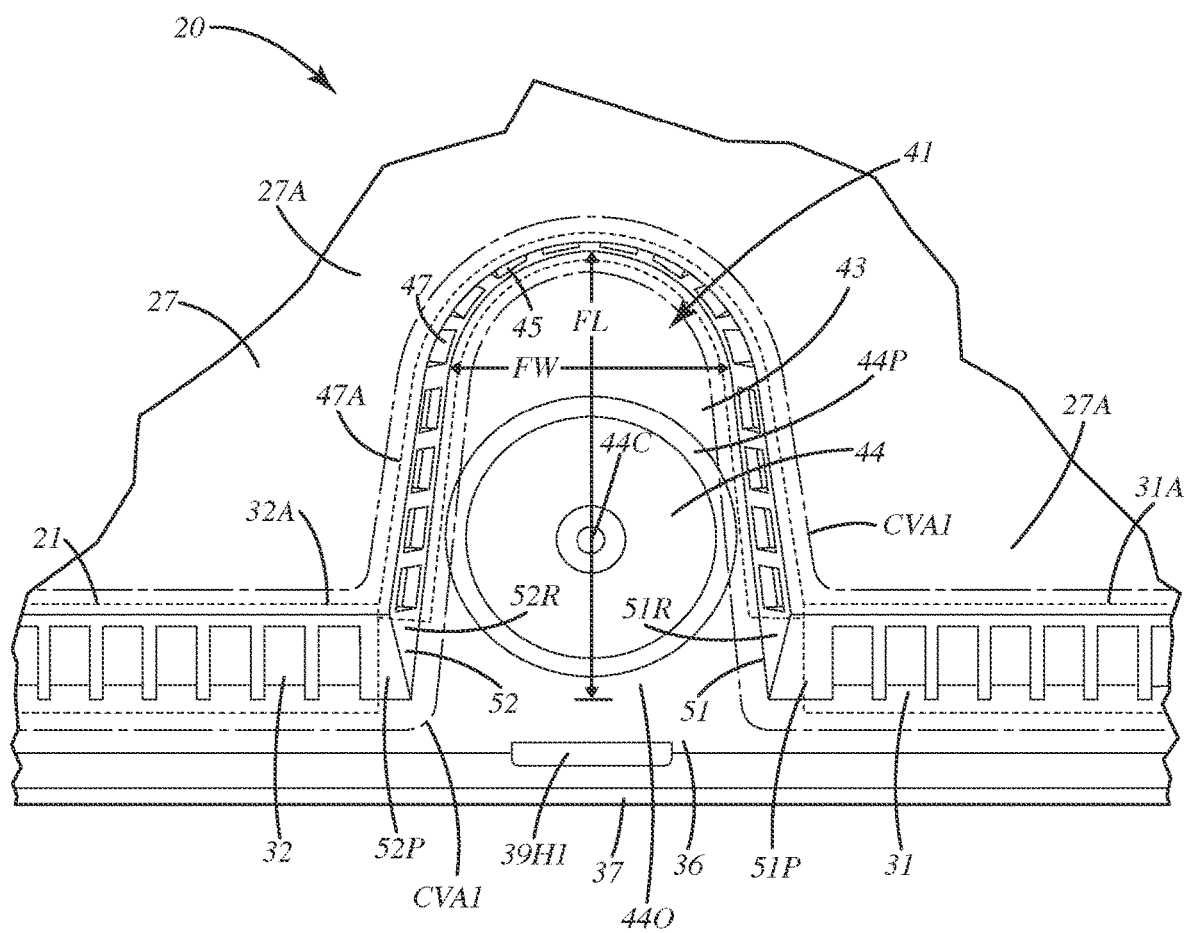
FIG. 4A is a top close-up view of the fastener recess illustrating the contiguous vented area along one side of the ridge vent.
Figure 4B:
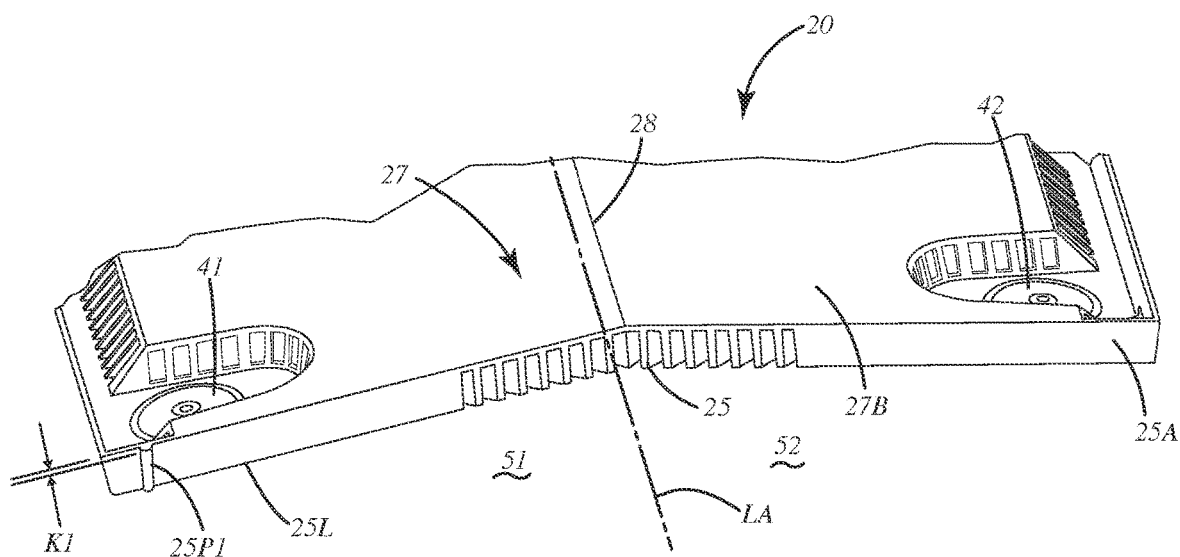
FIG. 4B is an end view of the ridge vent having a gap spacer.
Figure 4C:
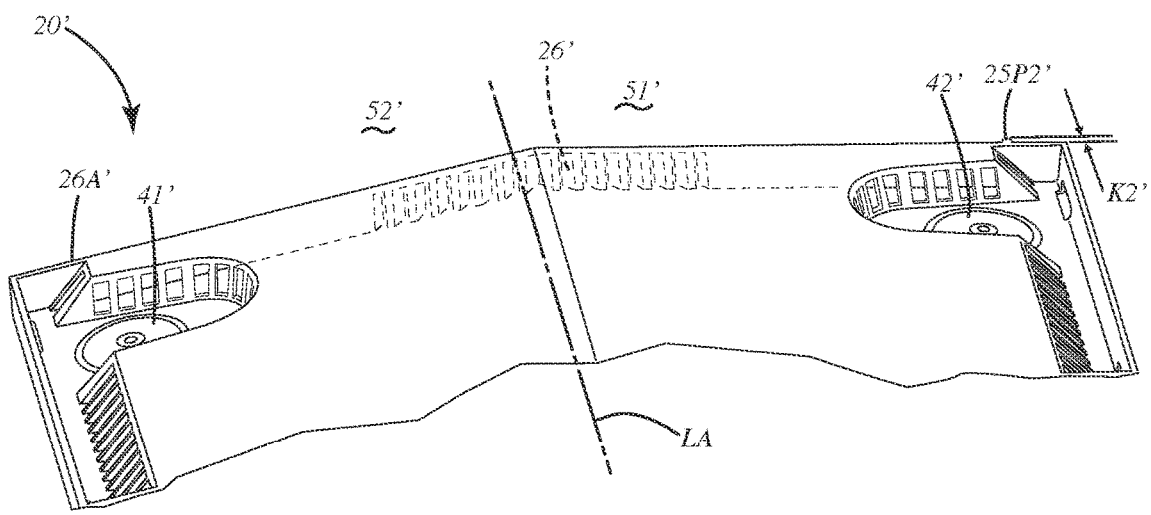
FIG. 4C is an end view of another ridge vent having another gap spacer.
Figure 4D:
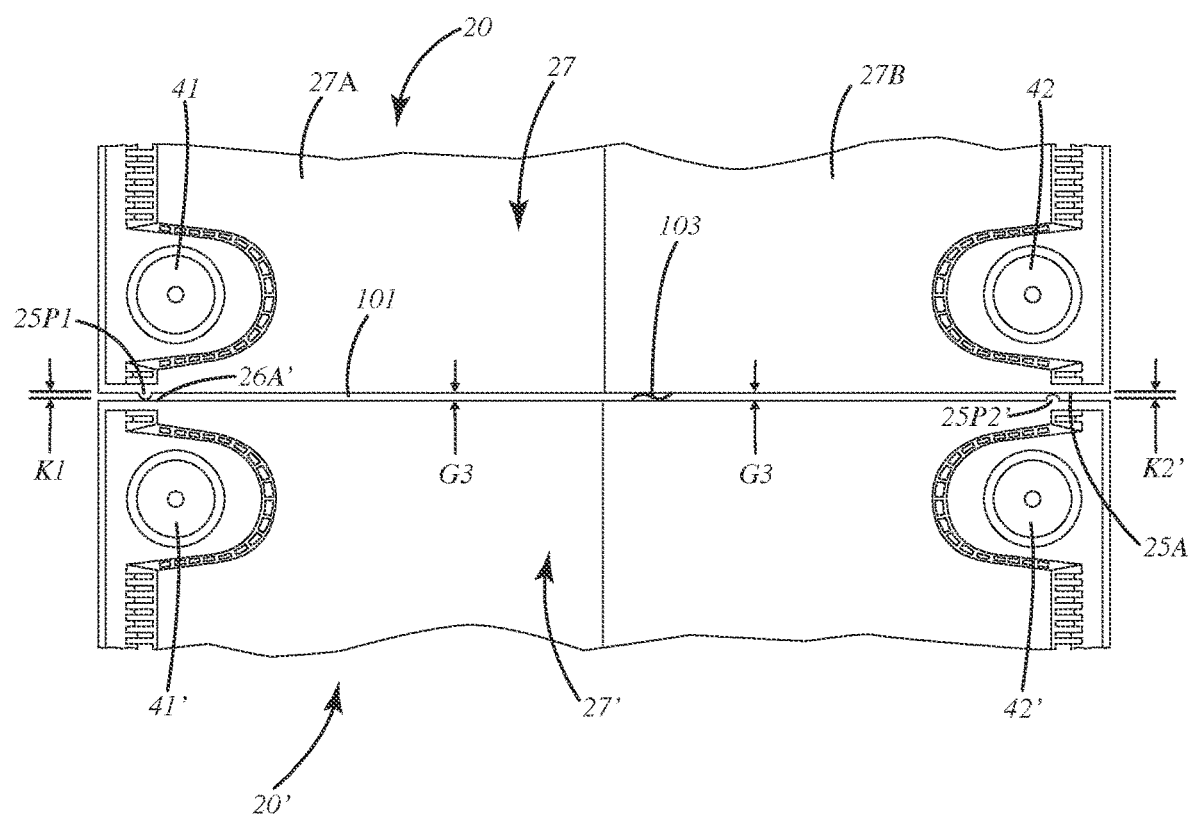
FIG. 4D is a top view of the ridge vent and another ridge vent with gap spacers producing an expansion gap between the ridge vent and other ridge vent.
Figure 5:
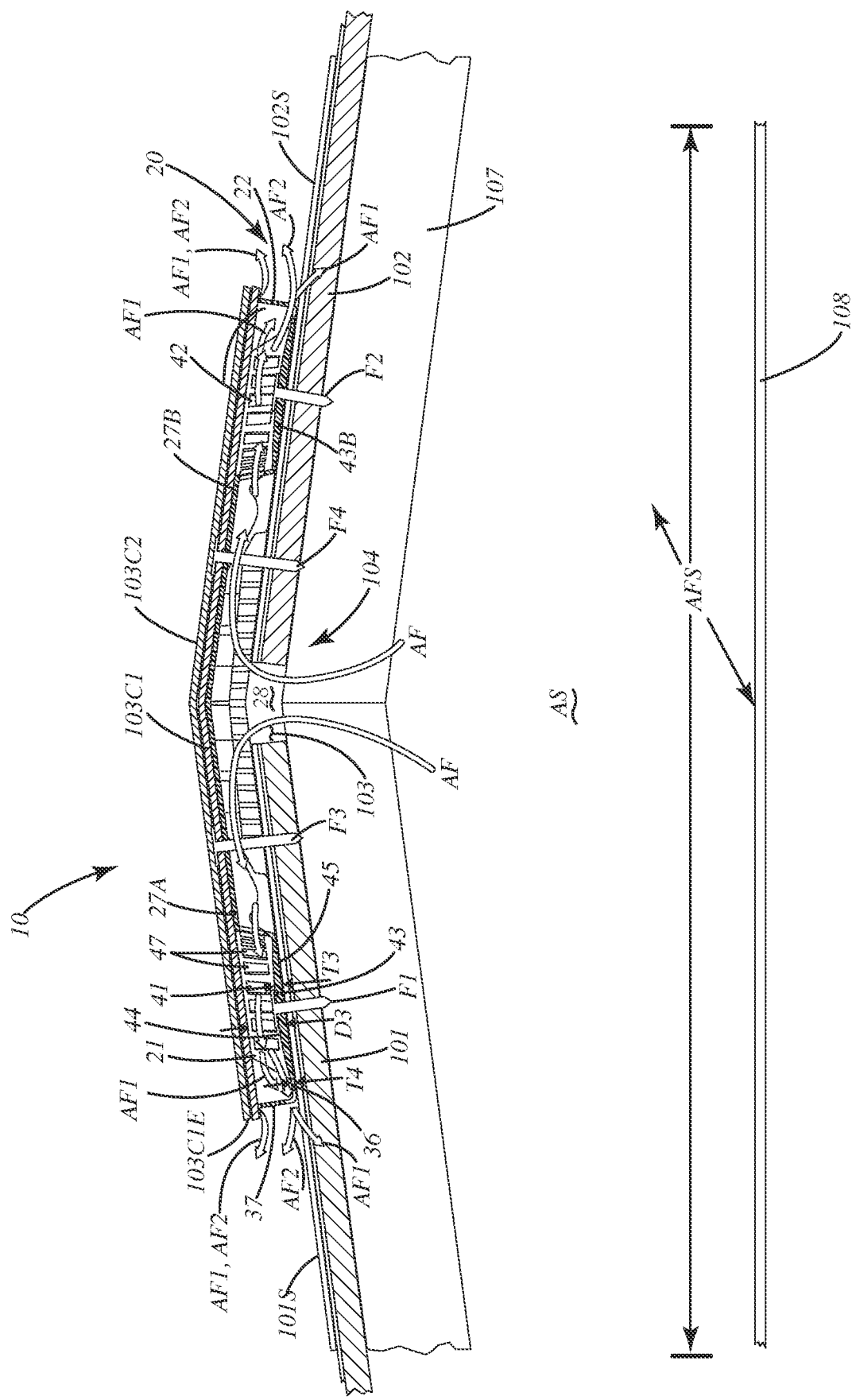
FIG. 5 is a partial section view of the ridge vent in a system where the ridge vent is secured to first and second roof surfaces of a building with fasteners, over an attic space, with shingles further fastened over the ridge vent with fasteners.
Figure 6:
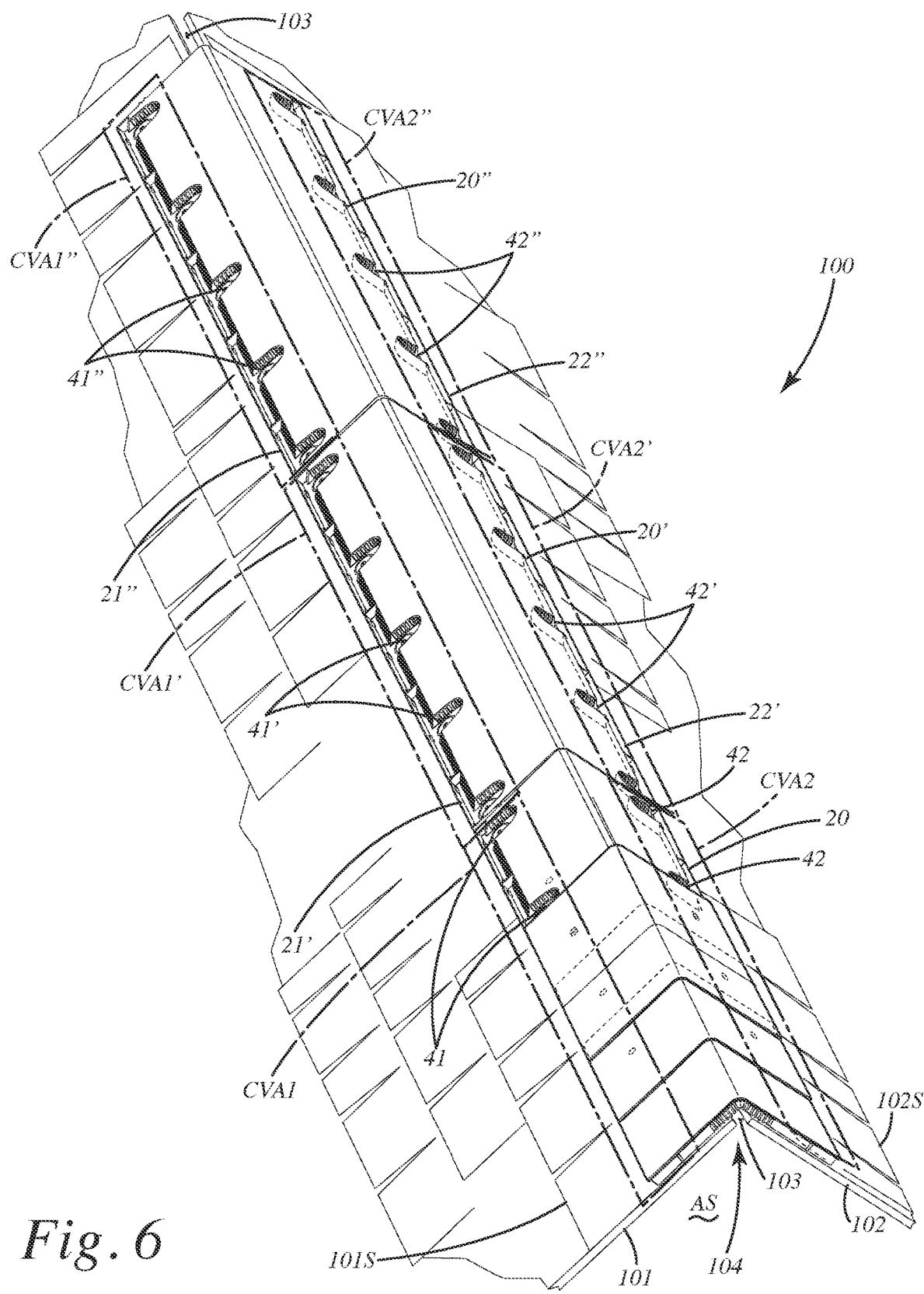
FIG. 6 is a perspective view of multiple ridge vents of a system over a roof, covering an elongated opening at a peak of the roof of the building.

A current embodiment of the ridge vent system and roof vent is shown in FIGS. 1-6 and generally designated 10 and 20, respectively. The ridge vent 10 can be installed on a building 100, generally over an elongated opening 103 defined at the peak 104 where a first roof surface 101 meets a second roof surface 10, as shown in FIGS. 5 and 6. The roof surfaces can be covered with shingles 101S, 102S and an underlayment for waterproofing or other surfaces. The roof surfaces 101 and 102 can be sheets, boards or panels, constructed from wood, metal, plastic, composites or other structural materials. Immediately under the roof surfaces can be a support structure 107 that supports the roof surfaces. Below that can be an attic floor 108, which can be an actual floor or a portion of a ceiling of a room, or a space under the floor 108. An attic floor space AFS can be defined at the floor 108, generally located below the support structure 107, which can be in the form or rafters, trusses or other elements. An attic space or volume AS can be defined below the roof surfaces 101, 102 and the attic floor. Of course, in some applications, the attic space and the attic floor can be absent, with the roof surface simply covering a room or volume in the building.

Generally, the ridge vent system, with the ridge vent 10 installed on the roof surfaces over the opening 103 allows airflow AF to traverse from the attic space AS, along multiple pathways through the ridge vent 10. For example, as shown, the initial airflow AF from the attic space AS can be ventilated out the opening 103 through the ridge vent 20 and out corresponding airflow pathways AF1 and AF2. The airflow pathways AF1 can be associated with multiple sidewall ventilation elements, for example venting slots 31, 32 defined along the exterior sidewalls of the ridge vent 20, while the airflow pathways AF2 can be associated with multiple venting slots 47 defined in each of the fastener recesses 41, 42, also referred to as nailing flange recesses herein. With this system of multiple airflow pathways through multiple different slots along the sidewalls and the fastener recesses of the ridge vents, airflow ventilated out from the attic space can be maximized. In turn, this can prevent moisture and heat build-up inside the attic space AS. In some cases, the ridge vent system 10 can be designed so that multiple ridge vents 20, 20', 20" as shown in FIG. 6, are included in the ridge vent system 10. These ridge vents provide multiple airflow paths AF1 and AF2, through the exterior sidewall slots of the ridge vents as well as the fastener recess venting slots, which cooperatively form contiguous vented areas as described below. The additive effect of these contiguous vented areas can provide an attic ventilation area which allows the ridge vent system to provide ventilation at a minimum of at least 1 square foot of attic ventilation area for every 300 square feet of attic floor space AFS. This ventilation can correspond to and meet the requirements mandated by the U.S. Federal Housing Administration.

Turning now to FIGS. 1-4A, the ridge vent 20 will be described in more detail. In particular, with reference to FIG. 1, the ridge vent can include a body 23 having a longitudinal axis LA and a width W. The body 23 can include a first end 25 and a distal second end 26 along with a first side S1 and a second side S2 on opposite sides of the longitudinal axis LA. The body itself can include a top plate 27 extending from the first side S1 to the second side S2. This template can include a first top plate side 27A and a second top plate side 27B. These first and second top plate sides can be generally planar plates and can be joined across the longitudinal axis LA via a bending region 28. This bending region 28 can be an area of flexibility and/or resilience allowing the bending region to bend, flex or otherwise provide angular and/or other movement between the first top plate side and the second top plate side. As a result, the first top plate side and the second top plate side can move and change angular orientation relative to one another.

Figure 1:
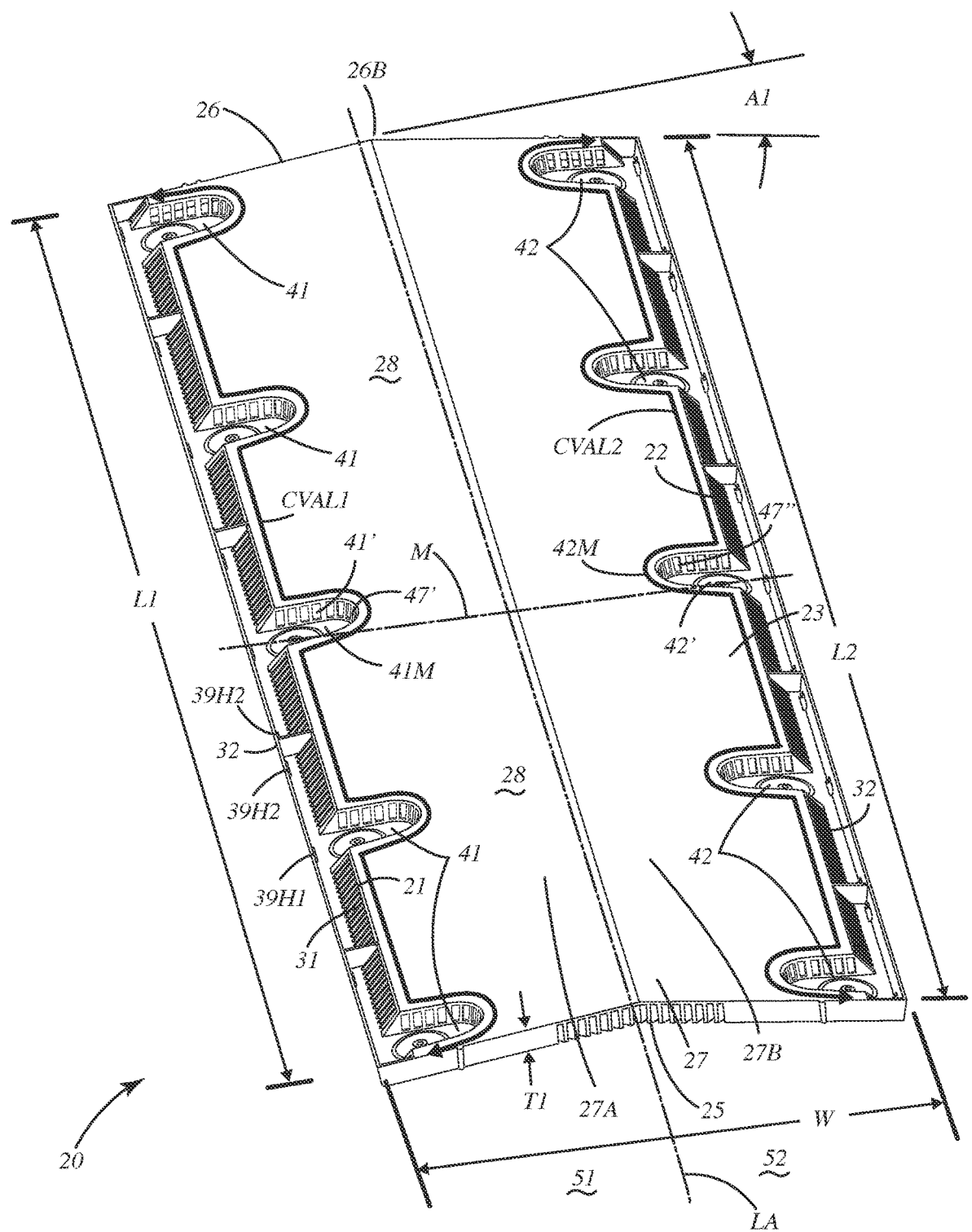
FIG. 1 is a top perspective view of a ridge vent of a current embodiment.
Figure 2:
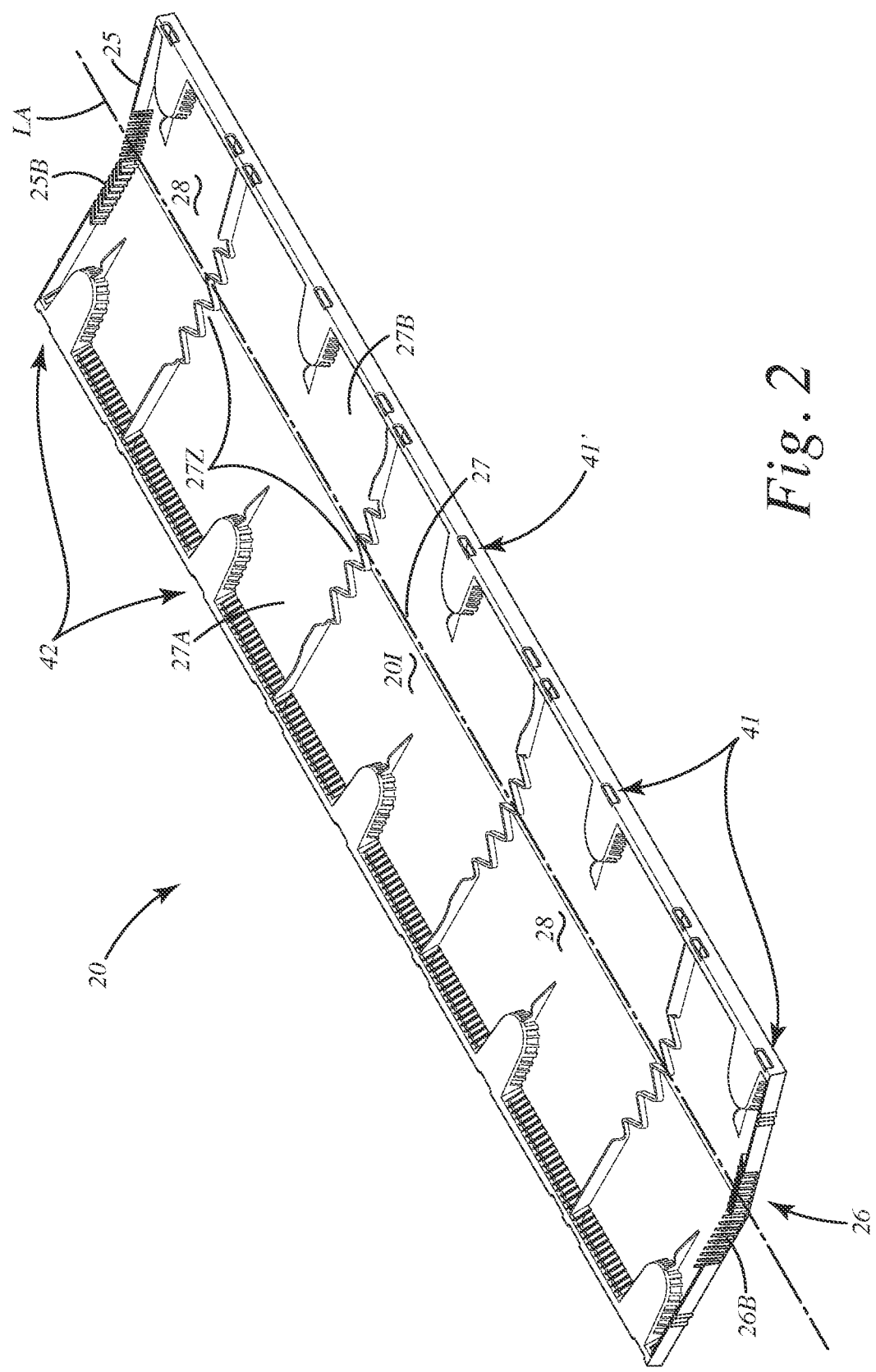
FIG. 2 is a bottom perspective view thereof.

For example, as shown in FIG. 1, the first top plate side 27A can be at a first angle A1 relative to the second top plate side 27B. A user can press or move the first top plate side 27A relative to the second top plate side 27B, in which case the bending region 28 yields, bends or otherwise changes shape to allow that first angle A1 to change to a second angle, which optionally can be a greater angle depending on the slope of the roof surfaces upon which the ridge vent 20 is placed. In some cases, the first end 25 and second end 26 of the body can include bending structures 25B and 26B that facilitate bending of the bending region 28 and the side plates 27A and 27B relative to one another. Optionally, the ridge vent can include a lower side of the top plate 27 as shown in FIG. 2. This lower side can include zigzag walls 27Z that undulate or zigzag back and forth, across the width and transverse to the longitudinal axis, to accommodate and facilitate bending of the top plate 27, and in particular the top plate sides 27A and 27B relative to another.

Further optionally, as shown in FIGS. 4B-4D, the ridge vent can be constructed to include end walls with spacers that promote spacing or gapping between adjacent ridge vents when installed on a peak or ridge of a roof structure. Generally, these spacers can come in a variety of forms and optionally can be included on the respective end walls of each ridge vent that is placed adjacent another corresponding ridge vent. With reference to FIG. 4B, this can be implemented via a first spacer 25P1 that can be placed along an end wall 25. This first spacer 25P1 can be in the form of a ridge, a projection, a protrusion, a bump or some other element that projects outwardly from the end wall 25 of the ridge vent 20. This first spacer 25P1 can be located on a first side 51 of the longitudinal axis LA. This first spacer 25P1 as shown can be in the form of a raised ridge that extends outward a distance K1 from the end wall 25. The spacer 25P1 can extend from the top plate 27 downward to a lower edge 25L of the ridge vent. Optionally, the spacer, when in the form of a simple projection may not extend from the top plate 27 to the lower edge 25L, and may simply be disposed between these elements. The first spacer 25P1 also can be located laterally, away from the bending region 28 of the ridge vent 20. In some applications, there can be one or more additional spacers place adjacent the first spacer 25P1, optionally extending toward the center or bending region 28 of the ridge vent 20. As shown in FIG. 4B, the ridge vent 20 optionally can be void of another spacer at the opposing end 25A of the end wall 25 on the second side 52 of the longitudinal axis LA.

FIG. 4C illustrates another and 26". This ridge vent 20' can be substantially identical to the ridge vent 20 described in FIGS. 1-4B, but can include a second gap spacer 25P2'. This gap spacer 25P2' can be located on the first side 51' of the longitudinal axis LA. This second gap spacer 25P2' can be similar or identical to the first gap spacer 25P1 as described above and can extend outward from the end wall 26 the distance K2'. The end wall 26' of this other ridge vent 20' also can be void of any gap spacers on the second side 52' of longitudinal axis LA, at or near the opposing end 26A of the end wall 26. This part of the end wall can be generally flat. It will be noted that each of the ridge vents 20 and 20' can be outfitted to include gap spacers like those described above on opposite ends of those vents. Those first and second spacers on opposite ends can likewise alternate from one side 51 to the other 52 from one end to the other when laid down on a ridge, the spacers of adjacent vents can thus be placed adjacent end walls that are void of other spacers of the adjacent vents.

The spacers 25P1 and 25P2', and any of the other gap spacers on the ridge vents can extend outward from the respective end walls 25, 26' the distance K1 or K2, which can be optionally at least 1/32 inch, 1/16 inch, 1/8 inch, 1/4 inch, 1/2 inch, or other distances, depending on the suitable spacing between adjacent ridge vents installed along a roof ridge. The spacing can correspond with anticipated amount of expansion of the ridge vents installed on the ridge during periods of high temperature. For example, in the summer, during elevated temperatures, the ridge vents, which can be constructed from a polymer in some cases, can absorb heat and can expand in length and width. The gap spacers described here can allow the adjacent ridge vents to increase in overall length and expand toward one another without buckling or damage to the ridge vents when this occurs.

As shown in FIG. 4D, the gap spacers 25P1 and 25P2' can be configured to establish an expansion gap G3 between adjacent ridge vents 20 and 20' when installed on a roof surface 101, generally over an opening 103 in a ridge of the roof surface 101. As shown there, the first gap spacer 25P1, extending outward from the end wall 25 of the ridge vent 20 distance K1, can engage the end wall 26' on the next adjacent ridge vent 20, before that vent 20' is fastened down. Accordingly, the spacer 25P1 can establish the gap G3 between the respective end walls 25 and 26' and the respective ridge vents 20 and 20' Likewise, the second gap spacer 25P2, extending from the end wall 26' of the other ridge vent 20 the distance K2' can establish that gap G3 near it, between the end walls 25 and 26 of the adjacent ridge vents 20 and 20'. The gap G3 can be consistent across the end walls, from the first spacer to the second spacer. The gap G3 also can correspond to the distances is K1 and K2'.

The expansion gap G3, as shown in FIG. 4D, again can be established by the spacers when the ridge vents 20 and 20' are fastened down to the roof surface 101. In some cases, the installation of these ridge vents can be during cold weather. Thus, when temperatures rise in another season, for example summer, the ridge vents 20 and 20' in some cases can expand in length. When this occurs, the gap G3 can decrease in the regions or areas between the first spacer 25P1 and the second spacer 25P2'. This can allow for local expansion of the respective ridge vents between the spacers, into the gap G3, and thereby can prevent the ridge vents from buckling along the ridge or peak of the roof surface 101, which can cause structural and/or aesthetic issues for the ridge vent system. Of course, in other applications, other types of elements and components can be used to accommodate expansion or contraction of the ridge vents in fluctuating temperatures.

The top plate 27 shown in FIGS. 1 and 2 can include a first exterior sidewall 21 and a second exterior sidewall 22. The sidewalls can generally be mirror images of one another across the longitudinal axis LA. The sidewall 21 and its features will be described here, noting that the other sidewall 22 can have virtually identical structure and features. The first exterior sidewall 21 can extend downward from the top plate first side 27A. The first exterior sidewall 21 can be angled downward from the top plate, optionally between 15° and 75°, inclusive, or between 1° and 90°, inclusive, as can the second exterior sidewall relative to the second top plate side. The precise angle can be selected to reduce the overall thickness T1 of the ridge vent 20 to optionally less than 3 inches, less than 2 inches or less than 1 inch, about 1 inch, about ⅝ inch or about ¾ inch, depending on the application. As a result, with the low profile, the ridge vent can be less likely to be affected by wind and possibly blown off the roof or otherwise damaged in wind.

The first exterior sidewall 21 can define a first plurality of sidewall ventilation elements, shown as first sidewall slots 31, and a second plurality of ventilation elements 32, shown as sidewall slots 32, for example in FIGS. 1 and 3-4A. These slots can be polygonal, open slots that lead from an interior 201 of the ridge vent 20 out to the exterior of the ridge vent and into the environment. The slots can be of varying shapes, such as circular, elliptical triangular or other shapes. These slots can extend generally from the first top plate side 27A downward to the lip 36 which extends away from the first exterior sidewall 31. These sidewall slots also can be opposed to the first end wall 37 that extends upward from the first lip and that is generally nonparallel to the first exterior sidewall 21 and the slots themselves. Instead of sidewall slots, the ventilation elements can be in the form of holes, recesses, apertures, gaps, filter material, fabric, woven material, nonwoven material, foam, batting or other materials depending on the application.

Figure 3:
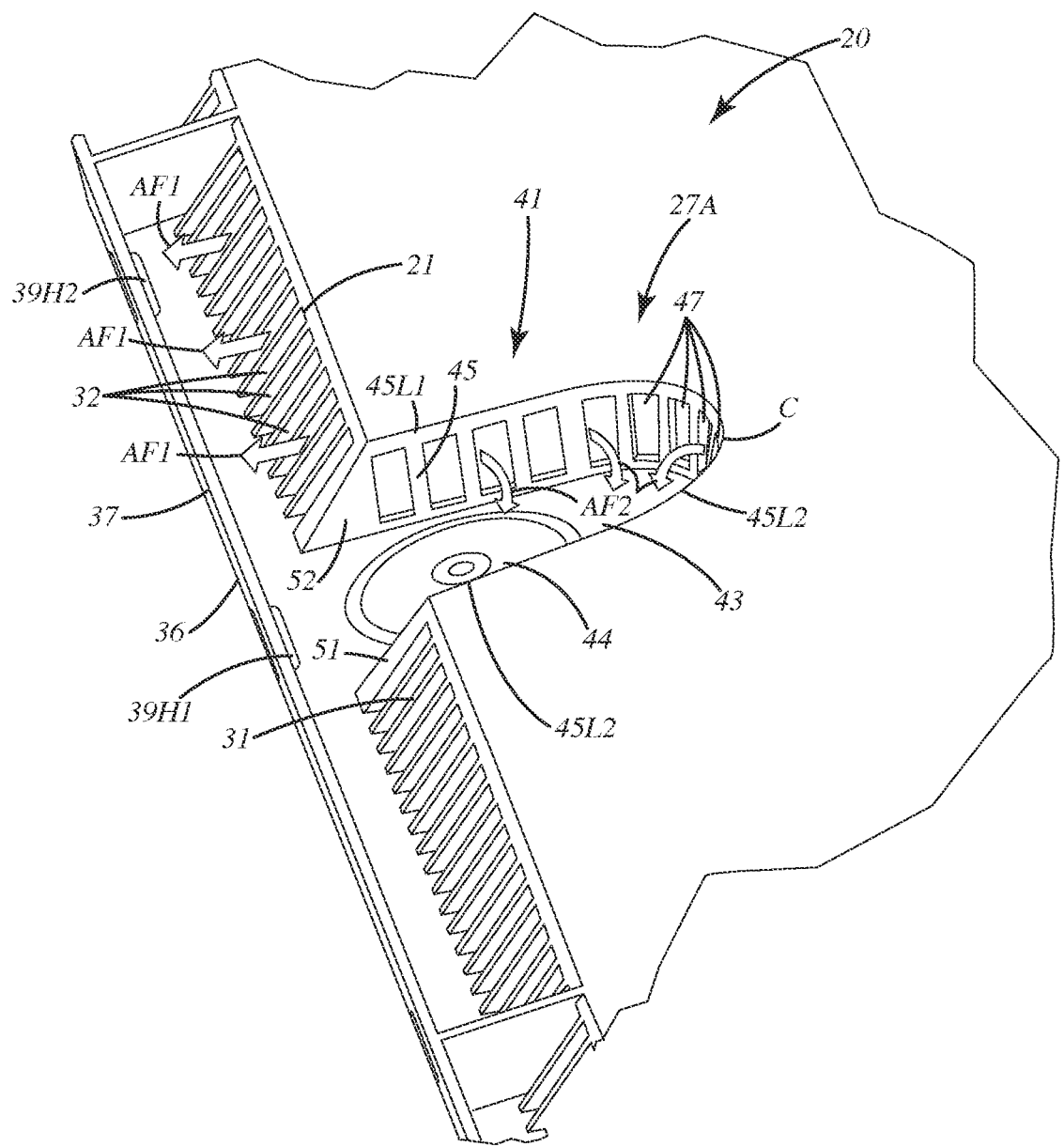
FIG. 3 is a close-up perspective view of the fastener recess and flange illustrating multiple recess slots and sidewall slots that are contiguous with one another.

With reference to FIGS. 1, 3 and 4, the first exterior sidewall 21 and the first top plate side 27A cooperatively define one or more first fastener recesses 41, also referred to as nailing flange recesses. The recesses 41 can be designed, configured and sized such that a foot of a nail gun, a screw gun and/or a staple gun can fit within the recess to advance a fastener, such as a screw or a nail into a nailing flange or bottom wall 43 of the recess 41, and optionally through a target region 44 that is disposed on the flange or bottom wall 43. The bottom wall can include a flange length FL and a flange width FW. The length FL can be optionally at least 1.5 times or at least 2.0 times the width FW in some applications to provide adequate clearance for the head or nose of the tool driving the fastener.

Optionally, in some applications, the target region 44 can be disposed inward toward the longitudinal axis LA relative to an outer portion 440 of the nailing flange or bottom wall 43. This target region as shown can be of a circular shape, but in other applications, can be of a polygonal, rounded, or other shape. The target region also can extend a majority or all of the length FL and a majority or all of the width FW of the nailing flange or bottom wall. The target region 44 can be of a thickness T3 (FIG. 5) from the upper surface of the same to a lower surface thereof that is greater than a thickness T4 from the upper surface to the lower surface of the adjacent outer portion 440 of the nailing flange. The outer portion can extend a minority of the length FL, and can be of lesser area than the target region. In some cases, the target region can be optionally at least 5%, at least 10%, at least 15%, at least 20%, at least 25%, at least 50%, at least 75%, or at least 100% thicker than the adjacent outer portion. With this added thickness, the target region can withstand the impact and penetration of a fastener therethrough suitably. The target region optionally can be of a dome shape, of varying thickness from the center 44C to the perimeter 44P, optionally decreasing in thickness outward to the perimeter. In some applications, the perimeter 44P can serve as an indicia element to guide a user where to aim a fastener shot from a nail gun. For this purpose, the perimeter 44P can include a raised surface, such as a ridge or other projection, or a recessed surface, such as a groove or recess, or combinations of the foregoing so that a user can visually identify the target region, and its extent, to aim the fastener within it.

The first flange or recess again can extend inwardly from the first exterior sidewall 21 and downward from the first top plate side 27A. The first recess can be bounded by the bottom wall or flange 43 as noted above, as well as a recess wall 45. This recess wall 45 can define the third plurality of slots 47 between the bottom wall 43 and the first top plate side 27A. These slots 47 can be similar to the first plurality of slots and second plurality of slots 31 and 32 as described above.

The first recess wall 45 can be constructed as a U-, V- or parabolic shape and can open away from the longitudinal axis LA of the ridge vent 20. The recess sidewall 45 can include a first linear part 45L1 that extends toward the longitudinal axis LA of the ridge vent. This first linear part 45L1 can transition to a curved part 45C that transitions to a second linear part 45L2. The second linear part 45L2 can extend back toward the exterior sidewall 21. Generally, the first linear part 45L1 and second linear part 45L2 can be parallel or nonparallel, being angled relative to one another.

With reference to FIGS. 3-4A, the nailing flange recesses 41 can be reinforced with and/or otherwise include first 51 and second 52 transition corners or transitions. The first transition corner can be disposed between the first plurality of slots 31 and the third plurality of slots 47. The transition corner can include a portion 51P of the first exterior sidewall 21 that is solid, without any slots, to buttress the top plate side 27A above the first plurality of slots 31 and the third plurality of slots 47. A portion 51R of the recess wall 45 also can be solid and void of any ports. This can join the portion 51P of the exterior sidewall 21. These portions of the respective walls can cooperate to enhance the strength and support of the top plate side 27A. As mentioned, the second transition corner 52P can be disposed between the second plurality of slots 32 and the third plurality of slots 47 in the recess 41. The second transition corner 52 can include respective portions 52B and 52R of the exterior sidewall and the recess wall, similar to those of the first transition corner 51 as described above.

As shown in FIGS. 3-4A, the third plurality of slots 47 for each of the respective nailing flange recesses 41 can be disposed between corresponding ventilation sidewall slots along the exterior sidewall 21. As an example, the third plurality of slots 47 can be located between the first plurality of sidewall slots 31 and the second plurality of sidewall slots 32, respectively. The first plurality of slots 31 can form a first vented area 31A along the sidewall 21. The second plurality of slots 32 can form a second vented area 32A along the first sidewall 21. The third plurality of slots 47 can form a third vented area 47A along the recess wall 45 of the nailing flange recess 41. These three sets of slots 31, 32 and 47 and their respective vented areas 31A, 32A and 47A can cooperatively provide a first contiguous vented area CVA1 along the first exterior sidewall 21 and the first recess wall 45. This contiguous vented area CVA1 can extend along the entire sidewall and into each of the respective nailing flange recesses 41 along the first side S1. In this manner, the venting does not extend merely along the exterior sidewall, but also juts into and is provided within and around the nailing flange recesses 41. It will be appreciated that a similar construction and function for the venting be provided with regard to the second nailing flange recesses 42 that extend into and are defined along the second exterior sidewall 22 with the second top plate side 27B. Of course, a second contiguous vented area CVA2 can be defined along the second exterior sidewall 22 and the second recess walls of each of the respective second nailing flange recesses 42 along that second exterior sidewall 22.

Optionally, the first and second exterior side walls 21 and 22 can define lengths L1 and L2 respectively. The venting areas provided on each of the first side S1 and second side S2 of the ridge vent 20, however are not limited to these linear lengths alone. For example, the first contiguous venting area CVA1 along the first exterior sidewall 21 and the respective recesses 41 can have a first venting area length CVAL1. Likewise, the second continuous venting area CVA2 along the second exterior sidewall 22 and the respective recesses 42 can have a second venting area length CVAL2. The first venting area length CVAL1 can be greater than the first wall length L1. The second venting area length CVAL2 also can be greater than the second wall length L2. In some cases, the venting area lengths can be greater than the respective wall length optionally, at least 2% greater, at least 5% greater, at least 10% greater, at least 20% greater, or at least 25% greater than then the respective wall length. With the inclusion of the slots in the nailing flange recesses and along the exterior sidewall, this in turn can increase ventilation airflow through the ridge vent significantly over instances where the nailing flange recesses do not include corresponding recess slots.

As mentioned above, the ridge vent 20 can have multiple first nailing flange recesses 41 and second nailing flange recesses 42 disposed and formed adjacent the respective first exterior sidewall 21 and second exterior sidewall 22. As shown, there are five nailing flanged recesses 41 disposed across from one another or another across the longitudinal axis LA on each of the respective sides S1 and S2. Optionally, nailing flange recesses 41M and 42M can be disposed across from one another at the midline M of the lengths L1 and L2 of the sidewalls. With this construction, the nailing flanges can securely hold down the ridge vent, optionally in the center of the length of the vent, and prevent or impair it from buckling under expansion and contraction during exposure to different temperatures and environments.

As mentioned above, there can be any number of the various first and second recesses 41, 42 along the respective sidewalls. For example, the first exterior sidewall 21 and the first top plate side 27A can cooperatively define a third recess 41' that extends inwardly from the first exterior sidewall and downward from the first top plate side, distal from another first recess 41 along the first exterior sidewall. The third recess 41' can be bounded by a third bottom wall and a third recess wall extending from the third bottom wall to the first top plate side. The third recess wall can define a seventh plurality of slots 47' between the third bottom wall and the first top plate side. The seventh plurality of slots 47' can cooperate with the first, second and third plurality of slots to provide the first contiguous vented area CVA1 along the first exterior sidewall 21, the first recess wall and the third recess wall. The second exterior sidewall 22 and the second top plate side 27B can cooperatively define a fourth recess 42' that extends inwardly from the second exterior sidewall 22 and downward from the second top plate side 27B. The fourth recess 42' can be bounded by a fourth bottom wall and a fourth recess wall extending from the fourth bottom wall to the second top plate side. The fourth recess wall can define an eighth plurality of slots 47" between the fourth bottom wall and the second top plate side. The eighth plurality of slots 47" can cooperate with the fourth, fifth and sixth plurality of slots along the second exterior sidewall to provide the second contiguous vented area CVA2 along the second exterior sidewall, the second recess wall and the fourth recess wall.

As mentioned above, with reference to FIGS. 3-4A, the first end wall 37 can be joined with the first lip 36 that extends outward from the first exterior sidewall 21. One or more drain holes 39H1, 39H2 can be defined intermittently along the first end wall and/or the first lip along the first side S1 and across from the respective first exterior sidewall 21. These drain holes can be sized such that rain, snow, moisture and other liquids can drain out the holes 39H1 and 39H2, rather than entering primarily back through the slots 31, 32 and or 45 of the respective sidewall and/or nailing flange recess. In some cases, each drain hole 39H1 can be disposed immediately in front of a respective nailing flange recess 41, optionally centered on that nailing flange recess. Additional drain holes 39H2 can be disposed distal and/or between respective ones of the nailing flange recesses 41. These second drain holes 39H2 can be disposed across from the first and second plurality of sidewall slots depending on the application. The first drain holes 39H1 can be disposed across from and face the recess plurality of recess slots 47. Corresponding drain holes can be disposed along the second side S2, similarly situated relative to the corresponding second lip and second end wall across from the second exterior sidewall 22.

The ridge vent 20 can be included in a ridge vent system 10. With reference to FIGS. 5-6, the overall system will be described in more detail. There, the ridge vent 20 is shown applied with additional ridge vents 20' and 20" all of which generally cover elongated opening 103 along a ridge line of two adjacent first roof surface 101 and second roof surface 102. Each of these additional ridge vents can have multiple third and fourth nailing flange recesses 41', 41", 42', 42" with associated recess slots and sidewall slots, defined in their respective first exterior side walls 21', 21" and second exterior sidewalls 22', 22". The respective slots of the sidewalls and nailing flange recesses form respective contiguous venting areas CVA1' and CVA2', and CVA1" and CVA2". When added up, the first contiguous vented area CVA1 plus the second contiguous vented area CVA2, plus each third contiguous vented area CVA1' and CVA2', plus each fourth contiguous vented area CVA1", CVA2" equals an attic ventilation area. Airflow AF from the attic space AS escapes out through the elongated opening 103 along the air paths AF1 and AF2 (FIGS. 5 and 6) on both sides of each respective ridge vent to ventilate the attic space AS. Optionally, the ridge vent system including the ridge vents, which can vary based on the application, provide ventilation at a minimum of at least 1 square foot of attic ventilation area for every 300 square feet of attic floor space AFS.

Each of the respective ridge vents 20, 20' and 20" can be secured to the roof surfaces 101 and 102 via multiple fasteners. For example, multiple first fasteners F1 can be installed and advanced to project through or pierce each of the respective first bottom walls or nailing flanges 43 of each respective recess 41 on the first sides of the ridge vents. These fasteners can extend into the first roof surface 101 and optionally through it, and into an underlying support structure 107 or simply to the attic space. This can secure the first top plate side 27A and generally the ridge vent to the roof first roof surface 101. Multiple second fasteners F2 can be installed and advanced to project through or pierce each of the respective second bottom walls or nailing flanges 43B in the second sides of the ridge vents, as well as the second top plate side 27B, to the second roof surface 102. When this occurs, each of the ridge vents optionally can bend in the bending region 28 to finally conform to the angle of the first and second roof surfaces 101, 102 which can be nonparallel to one another. In this manner, the fasteners F1 and F2 can maintain the first top plate side 27A the second top plate side 27B in a nonparallel configuration relative to one another.

Optionally, the ridge vent 20 can be placed over shingles 101S and 102S that are disposed over underlayment and generally over the roof surfaces 101 and 102 respectively. When this occurs, the first fasteners F1 and second fasteners F2 can pierce through the first shingles 101S and second shingles 102S on opposing sides of the elongated opening 103.

The system 10 also can include multiple cover shingles 103C1 and 103C2 that are disposed over the top plate, optionally stacked one over the other in a partially overlapping configuration. The shingle 103C1 can extend over and cover the first plurality of recesses 41 and the first side of the ridge vent, as well as the second plurality of recesses 42 on the second side of the ridge vent. The shingles can extend outwardly to the respective first and second exterior sidewalls of the ridge vent, optionally covering the lip 36 or end wall 37 on the respective first and second sides of the ridge vent. In this manner, a space is left between the end wall 37 and the ends 103C1E of the shingles that are disposed over the top plate. In this manner, airflow can flow along the pathways AF1 and AF2 out between those elements. Further, there can be minute vertical gaps between the ends of the shingles and the lip 36 or end wall 37 of the ridge vent, so the airflow AF1 and AF2 can escape through these gaps and or the drain holes. In some cases, the ends of the shingles can move upward under the force of the air and slightly move so the airflow AF1 and AF2 can escape from the vent and into the environment.

The shingle 103C1 also can form a roof over each one of the respective nailing flange recesses 41 and 42, however airflow can still travel in each of the respective recesses out of the recess walls 45 and in particular the respective recess walls slots 47 of each of the respective recesses on both sides of the ridge vent.

The shingles can extend outwardly over each of the respective first fasteners F1 and second fasteners F2 and the respective first recesses 41 and second recesses 42. The shingles however, can be separated from the heads of the respective fasteners by distance D3 that is greater than a diameter of a head of the first and second fasteners. Is also noted that the airflow along the airflow path AF2 also moves over the respective heads of the fasteners F1 and F2 located within the respective nailing flange recesses.

The shingles can be fastened down to the ridge vent and the underlying surfaces via third F3 and fourth F4 fasteners. The third and fourth fasteners can project, pierce or penetrate the shingle 103C1 as well as the first top plate side 27A and the second top plate side 27B as well as the top plate in general. In particular, the third fastener F3 can project through the first top plate side 27A and into the first roof surface 101 as well as through the shingles 101S and any underlayment. This third fastener F3 however is distal from the first recesses 41 and is not disposed in those recesses. Indeed, the third fastener F3 can be disposed between the first recess 41 and the bending region 28. In some cases, the third fasteners F3 can be disposed between adjacent ones of the first recesses 41 and closer to the first exterior sidewall 21. The fourth fastener F4 can project through the second top plate side 27B and into the second roof surface 102 as well as through the shingles 102S and any underlayment. The fourth fasteners however can be distal from the second recesses 42 and not disposed in or enter those recesses. Indeed, the fourth fasteners F4 can be disposed between the second recesses 42 and the bending region 28. In some cases, the fourth fasteners F4 can be disposed between adjacent ones of the second flange recesses 42 and closer to the exterior sidewall 22. These third and fourth fasteners can be covered subsequently by another shingle 103C2 that is laid over the shingle 103C1. That shingle can partially overlap the first shingle 103C1, and can be further nailed with additional third and fourth fasteners securing it to the ridge vent and the underlying roof surfaces. Multiple shingles can be laid over the various adjacent ridge vents disposed along the peak to provide an aesthetically pleasing cover over that ridge vent to conceal the nailing flange recesses along the ridge vents.

Figure 7:
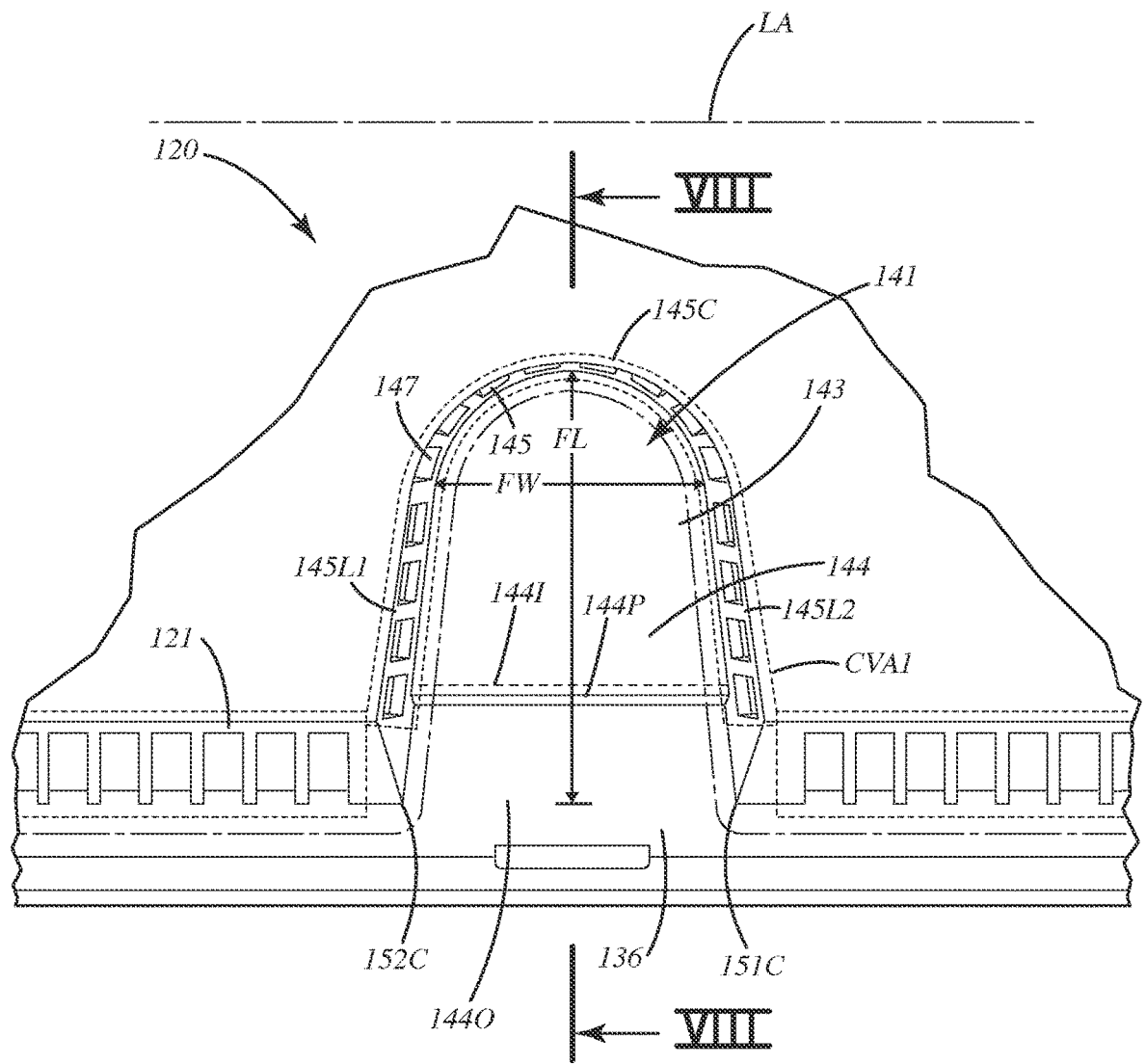
FIG. 7 is a top close-up view of a ridge vent of a first alternative embodiment of the ridge vent having a thickened target region in a nailing flange.
Figure 8:
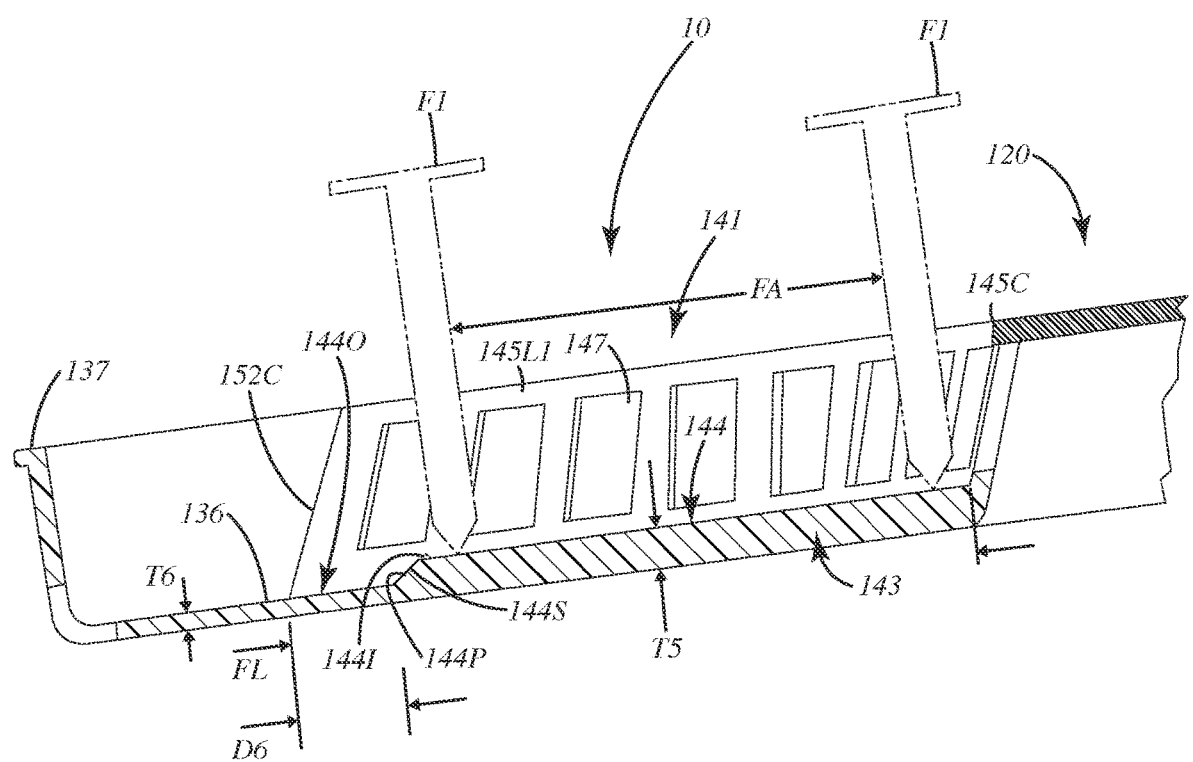
FIG. 8 is a section view thereof.

A first alternative embodiment of the ridge vent is illustrated in FIGS. 7-8 and generally designated 120. This embodiment is virtually identical in structure, function and operation to the embodiment of the ridge vent 20 described above with several exceptions. For example, in this embodiment, the ridge vent 120 can include a first flange or recess 141 extending inwardly from the first exterior sidewall 121 and downward from the top plate. The recess 141 can be designed, configured and sized such that a foot of a nail gun, a screw gun and/or a staple gun can fit within the recess to advance a fastener, such as a screw or a nail into a nailing flange thereof. Optically, the first recess 141 can be bounded by the flange, bottom wall or floor 143 as noted in the embodiment above, as well as a recess wall 145 which can be separated into different portions such as linear portions 145L1 and 145L2, as well as curved portion 145C, or other permutations or combinations thereof. This recess wall 145 can define the slots 147 between the bottom wall 143 and the top plate. These slots 147 can be similar to the slots in the nailing recess of the embodiment as described above.

In this embodiment however, the ridge vent 120 can include one or more nailing flanges or recesses 141 that can include a bottom wall or floor 143 with enhanced strength to withstand the impact force of a fastener driven therethrough with a nailing gun or other fastener driver. As shown in FIG. 7, the bottom wall can include a flange length FL and a flange width FW. The length FL can be optionally at least 1.5 times or at least 2.0 times the width FW like the embodiment above. The bottom wall also can include a target region 144 disposed inward toward the longitudinal axis LA relative to an outer portion 144O of the nailing flange or bottom wall 143. This target region 144 also can be disposed inwardly, toward the longitudinal axis LA, from the corners 151C and 152C, where the sidewall 121 meets the walls of the nailing recess or flange 141. As shown in FIG. 8, the target region 144 can be disposed inwardly a distance D6 from the respective corners. The target region 144 can span from one side of the recess across the width FW. It also can span as mentioned above a majority of the length FL of the recess 141 extending outwardly from and perpendicular to the longitudinal axis LA. The target region 144 can extend entirely across the bottom of the 143 of the recess 141 up to the perimeter 144P of the target region. This perimeter 144P can be delimited by a gradual or abrupt step 144S that transitions downward to the remaining portion or outer portion 144O of the floor 143 of the recess 141. That outer portion 144O can transition flush to the lip 136 which transitions to the outer wall 137.

The target region 144 optionally can extend a majority or all of the length FL and a majority or all of the width FW of the nailing flange or bottom wall. The outer portion 144O can extend a minority of the length FL, and can be of lesser area than the target region. The target region 144 can be of a thickness T5 from the upper surface of the same to a lower surface thereof that is greater than a thickness T6 from the upper surface of the adjacent outer portion 144O of the nailing flange recess 141. In some cases, the target region can be optionally at least 5%, at least 10%, at least 15%, at least 20%, at least 25%, at least 50%, at least 75%, or at least 100% thicker than the adjacent outer portion. With this added thickness, the target region can withstand the impact and penetration of a fastener therethrough suitably.

In some applications, the perimeter 144P can serve as an indicia to guide a user where to aim a fastener shot from a nail gun. In some cases, the perimeter 144P can include a dedicated indicia element 144I, which can be a raised surface, such as a ridge, step, transition, or other projection, or a recessed surface, such as a groove or recess, or combinations of the foregoing so that a user can visually identify the target region and its extend to aim the fastener within it. In some cases, the indicia element can be configured or displayed as a dotted or broken line adjacent or over the perimeter 144P or close to it and can include alphanumeric characters to indicate where the target region 144 begins and ends. Optionally, the dotted or broken line can include one or more raised projections, bumps or protrusions, or can be formed by one or more recesses, slots or apertures in the bottom wall 144. In some cases, the indicia element can be in the form of a paint, coating, or other region of a different color from the remaining portion 144O and/or the target region 144. Further optionally, the target region 144 itself can form the indicia element by including a paint, coating, or other region of a different color from the remaining portion 144O. With an indicia element or the perimeter being visible, a user can readily identify the fastener area FA within which it is suitable to advance a fastener F1 into the bottom of the nailing recess 141 and particularly and precisely penetrate through the bottom wall 143 within the target region 144. Again, where the target region 144 is thicker, it can withstand the forces due to the penetration of the fastener F1 therethrough, in some cases better than the remaining outer portion 144O of the recess. This can preserve the integrity of the nailing recess and the bottom wall 143 to provide for a stronger and more efficient securement of the ridge vent 122 an underlying substrate. Of course, where the target region 144 is thinner, for example, the same thickness as the remaining outer portion 144O, or some other thickness, the indicia element can delineate an area of the recess 141 that is simply the right location for driving a fastener through the nailing flange.

Figure 9:
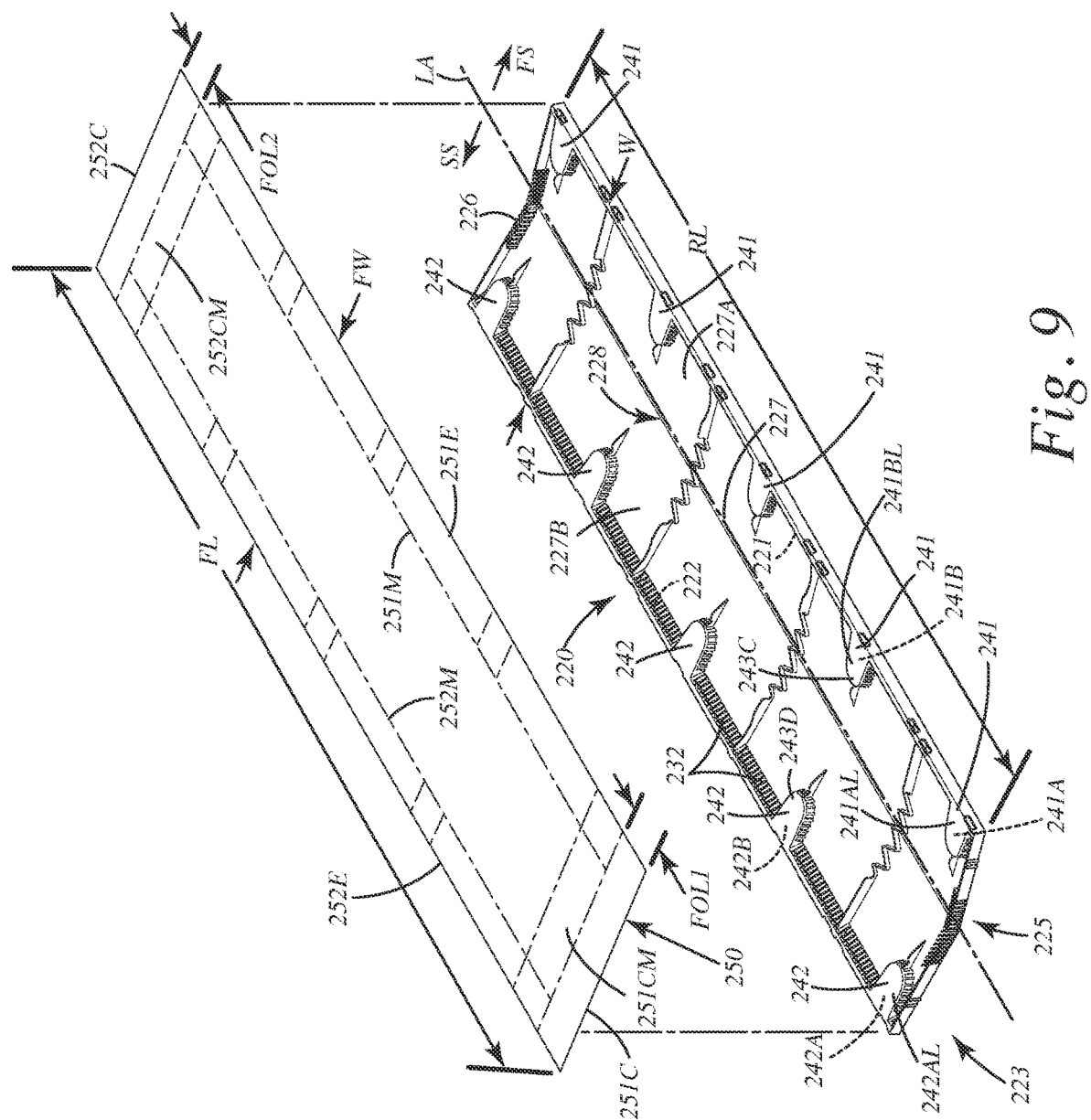
FIG. 9 is a bottom perspective view of a ridge vent of a second alternative embodiment having a filter membrane before being joined with a body of the ridge vent.
Figure 10:
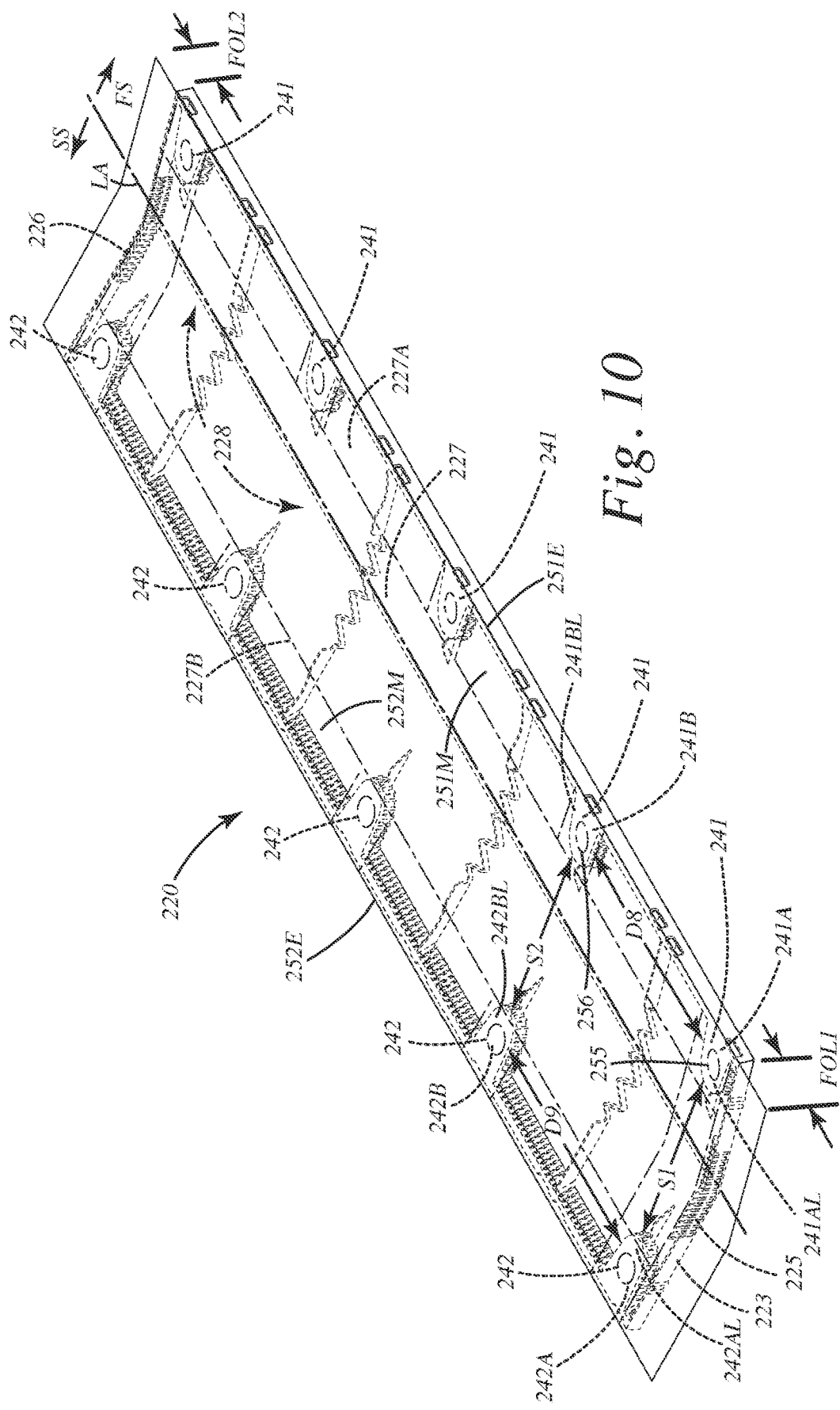
FIG. 10 is a bottom perspective view thereof having the filter membrane secured to the ridge vent along the bottom wall lower surfaces.
Figure 11:
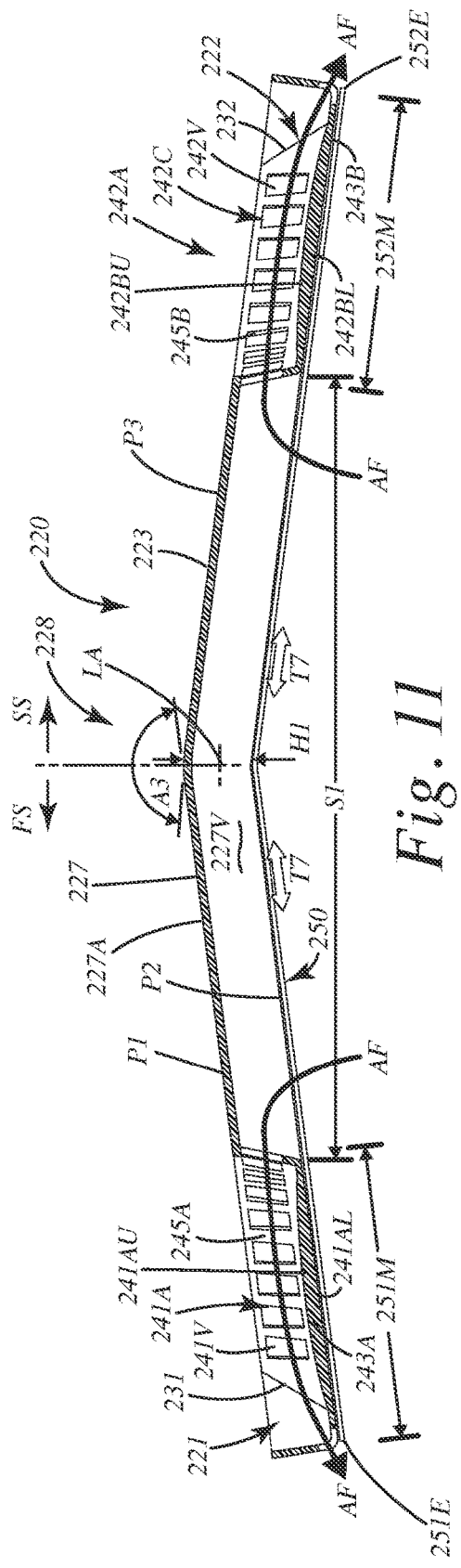
FIG. 11 is a partial section view of the ridge vent with the filter membrane secured to the bottom walls of fastener recesses and in a slack mode.

A second alternative embodiment of the ridge vent is illustrated in FIGS. 9-12 and generally designated 220. This embodiment is virtually identical in structure, function and operation to the embodiment of the ridge vents 120 and 20 described above with several exceptions. For example, in this embodiment, the ridge vent 220 can include a first flange or recess 241 extending inwardly from the first exterior sidewall 221 and downward from the top plate. The recess 241 can be designed, configured and sized such that a foot of a nail gun, a screw gun and/or a staple gun can fit within the recess to advance a fastener, such as a screw or a nail into a nailing flange thereof. Optionally, the first recess 241 can be bounded by the flange, bottom wall or floor 243A as noted in the embodiment above, as well as a recess wall 245A as shown in FIG. 11. The recess wall 245A can include ventilation elements 241V between the bottom wall and the top plate. These ventilation elements can be identical or similar to the slots or other elements in the nailing recesses of the embodiments described above, so will not be described again here.

Further, the ridge vent 220 can include a body 223 having a longitudinal axis LA, a length RW and a width W. The body 223 can include a first end 225 and a distal second end 226 along with a first side FS and a second side SS on opposite sides of the longitudinal axis LA, and can be virtually identical to the embodiments described above. The body 223 can include a top plate 227 extending from the first side FS to the second side SS. This top plate 227 can include a first top plate side 227A and a second top plate side 227B. These first and second top plate sides can be generally planar plates and can be joined across the longitudinal axis LA via a bending region 228. This bending region 228 can be an area of flexibility and/or resilience allowing the bending region to bend, flex or otherwise provide angular and/or other movement of the first top plate side relative 227A to the second top plate side 227B. As a result, the first top plate side and the second top plate side can move and change angular or other spatial orientations relative to one another, like the embodiments above and below.

In this embodiment however, the ridge vent 220 can include a filter membrane 250. The filter membrane 250 can be air permeable, so that air can flow through the membrane without substantial restriction. The filter membrane can be in a two-dimensional sheet form as shown, with a thickness of less than 20 mm, less than 10 mm, less than 5 mm, less than 2 mm or less than 1 mm. The filter membrane can include a length FL and a width FW. Optionally, the filter membrane can be elastic along its length FL and/or its width FW. Accordingly, the filter membrane can stretch along its width and/or along its length. This can allow the filter membrane 250 to conform and stretch along and/or across its width, and along and/or across its length, depending on the orientation of the filter membrane relative to the ridge vent and/or a roof surface to which the ridge vent is applied. This ability to stretch also can allow the filter membrane to conform to contours of the ridge or roofing surface to which the ridge vent is applied.

Although referred to as a filter membrane, the element 250 may or may not act as a filter, that is, it may or may not filter or remove particulate matter, dust, debris, molecules, compounds, etc. from air or gas passing through it. The filter membrane can have a certain level of vapor permeability and/or breathability and can operate as a barrier to water or other liquids, yet still be air and/or vapor permeable. The filter membrane optionally can be breathable, non-perforated and can have microscopic pores. The filter membrane can prevent water intrusion through the ventilation elements, in whatever form, and through the bottom of the ridge vent into a structure. The filter membrane 250 however can allow moisture or water vapor to pass through it and out the ridge vent into the environment from a structure to allow unwanted moisture to escape the structure. Again, however, the ridge vent can prevent or impair bulk water intrusion through the ridge vent into the structure. Some examples of filter membrane can include Tyvek®, available from DuPont of New Jersey, Delta® Vent SA, available from Cosella-Dorken, of Germany, Barricade® Wrap, available from Barricade Building Products of Doswell, Virginia, and a variety of other, similar materials. In some cases, the filter membrane can be self-adhering and can include an adhesive, glue or other sticky compound to allow it to stick to parts or portions of the ridge vent as described below.

The filter membrane can be constructed to have various other optional characteristics and properties. For example, the filter membrane can be constructed to include certain permeability rate. The filter membrane can be vapor impermeable and can be rated at 0.1 perms or less. Further optionally, the filter membrane can be vapor semi-impermeable, having the ability of 1.0 perm or less and greater than 0.1 perms. Yet further optionally, the filter membrane can be vapor semi-permeable having permeability of 10 perms or less and greater than 1.0 perms. Even further optionally, the filter membrane can be vapor permeable, having permeability of greater than 10 perms.

Although shown as a flat sheet of material, the filter membrane can be in the form of a fibrous material, a fabric, woven or nonwoven, a three-dimensional foam or foam like material, batting, fibers, or some other air permeable material. The filter membrane can be constructed from polymers and/or composites or mixtures thereof. In some applications, the filter membrane can be constructed from polymers that can be melted when heated to bond to another component, such as the ridge vent as described below. When so melted or heated, the filter membrane optionally can bond to or become joined with the ridge vent. Alternatively, the ridge vent can melt or change so that it embeds in and or joins with the filter membrane.

Turning now to FIGS. 9 and 10, as mentioned above, the filter membrane 250 can include a filter length FL and a filter width FW. The filter membrane 250 can be joined with the body 223 of the ridge vent 220. The filter membrane can include a first side edge 251E and a first side margin 251M adjacent that edge, and a second side edge 252E with a second side margin 252M adjacent that edge. The first side edge and second side edge can be disposed opposite one another across the longitudinal axis LA. The filter membrane 250 also can include a first filter membrane end 251C and a second filter membrane end 252C disposed at opposite ends of the filter membrane 250. Each of the respective ends can include respective end margins, for example a first end margin 251CM and a second end margin 252CM.

As with the embodiments above, the body 223 of the ridge vent 220 can be virtually identical to that of the embodiment of the ridge vent 120 and 20 described above. For example, the body 223 can include a first end wall 225B and a second opposing end wall 226B. When the filter 220 is joined with the body 223 and generally with the ridge vent 220, the filter membrane 250 can overlap certain portions thereof. For example, as shown in FIGS. 9 and 10, the first end margin 251CM can project beyond the first end wall 225B of the body 223 by a distance FOL1. The second end margin 252CM of the filter membrane 250 can project beyond the second end wall 226B of the body 223 by a distance FOL2. These distances optionally can be equal as shown, but of course can be different in some applications. The distances FOL1 and FOL2 can be optionally 0 inch, ⅛ inch, ¼ inch, ½ inch, ¾ inch, 1 inch, 1¼ inch, 1⅛ inch, 1½ inch, 2 inches or other distances depending on the application. With this extension of the filter membrane beyond the end walls 225B and 226B, the filter optionally can cover any underlying opening in the ridge of the roof when two ridge vents are placed adjacent one another, between their respective end walls. This in turn can provide a better envelope to prevent or impair precipitation, water or other elements from entering the opening under the adjacent ridge vents between their respective end walls. Of course, the filter in some cases may not extend at all beyond the respective end walls 225B, 226B of the body 223 in some applications.

Optionally, for the above-noted extensions of the filter membrane beyond the ends 225B and 226B of the body 223, the filter membrane 250 can include a filter length FL that is greater than the length RL of the ridge vent and/or the body 223 thereof. Further in some cases, the filter may extend beyond one end wall, but not beyond the other. Where the filter membrane extends beyond the end walls 225B, 226B of the body 223, that filter membrane within the respective distances FOL1 and/or FOL2 can extend free from attachment to the body, or any other component of the ridge vent 220, in a cantilevered manner beyond the body. Of course, where the filter membrane is flexible, resilient and/or non-rigid, the filter membrane in these regions can bend, flex or hang from the ends. Generally, the margins 251CM and 252CM in these regions can be free from attachment to the end wall, sidewalls, the top plate, any of the recesses or other components of the ridge vent. Where they extend in a cantilevered manner, and the filter membrane 250 is flexible, the respective margins 251CM and 252CM can flex and/or bend relative to one another or other objects with which they come into contact.

As mentioned above, the ridge vent 220 and body 223 can have similar components to the embodiments above. For example, as shown in FIGS. 9 and 11, the ridge vent 220 can include a first exterior sidewall 221 that can extend downward from the top plate 223 on the first side FS of the longitudinal axis LA. This first exterior sidewall 221 can be angled downward from the top plate 227, and in particular, can extend from the first top plate side 227A, similar or identical to the embodiment above. The sidewall 221 can include ventilation elements 231, which can be similar or identical to those elements 31 noted above in the first embodiment. Similarly, the first exterior sidewall 221 and the first top plate side 227A can cooperatively define a first recess 241A, also referred to as nailing flange recesses as discussed above. The recess 241A can extend inwardly from the first exterior sidewall 221 and downward from the first top plate side 227A. That first recess 241A can be bounded by a first bottom wall 243A and a first recess wall 245A extending from the first bottom wall to the first top plate side. The features characteristics and properties of these walls can be identical or similar to that of the current embodiments described above. For example, the first recess wall 245A can include ventilation elements in the form of slots or other apertures for air flow, or in other cases, it might not. The first bottom wall 243A can include a first bottom wall upper surface 241AU that faces upward into the first recess 241A, and a first bottom wall lower surface 241AL that faces downward, under or beneath the first recess 241A. Optionally, the lower surface can be flat, planar, contoured and/or curved, depending on the application. As shown, however, that surface 241AL is generally a flat, planar surface. The bottom wall 243A also can include the various target regions, thicknesses, contours etc. of the bottom wall 43 described in the embodiment above.

The ridge vent 220 further can include a second exterior sidewall 222 that can extend downward from the top plate 223 on the second side SS of the longitudinal axis LA. This second exterior sidewall 222 can be angled downward from the top plate 227, and in particular can extend from the second top plate side 227B, identical or similar to the embodiment above. The sidewall 222 can include ventilation elements 232, which can be identical or similar to those elements noted above in the first embodiment. Similarly, the second exterior sidewall 222 and the second top plate side 227B can cooperatively define a second recess 242A. The recess 242A can extend inwardly from the second exterior sidewall 222 and downward from the second top plate side 227B. That second recess 242A can be bounded by a second bottom wall 243B and a second recess wall 245B extending from the second bottom wall to the second top plate side. The features, characteristics and properties of these walls can be identical or similar to that of the current embodiment described above. For example, the second recess wall 245B can include ventilation elements in the form of slots or other apertures for air flow, or in other cases, it might not.

The second bottom wall 243B can include a second bottom wall upper surface 242BU that faces upward into the second recess 242A, and a second bottom wall lower surface 242BL that faces downward, under or beneath the second recess 242A. Optionally the lower surface can be flat, planar, contoured and/or curved, depending on the application. As shown, however, the surface is generally flat and planar. The bottom wall 243B also can include the various target regions thicknesses contours etc. of the bottom wall 43 described in the embodiment above.

With reference to FIG. 10, the second bottom wall lower surface 242BL can be separated by a first span S1 from the first bottom wall lower surface 241AL. These respective bottom surfaces can lay on opposite sides FS and SS of the longitudinal axis LA Likewise, the respective first recess 241A and second recess 242A can be disposed on opposite sides longitudinal axis, directly opposing one another. Of course, these recesses can be offset from one another and not directly across from one another across the longitudinal axis LA.

As further shown in FIG. 10, the ridge vent 220 can include multiple ones of first recesses, like the recess 241A on the first side FS, and multiple ones of second recesses, like the recess 242A on the second side SS of the longitudinal axis. These respective recesses can be directly opposed from one another across the longitudinal axis LA or offset relative to another, depending on the application. As an example of another recess on the first side FS, the first exterior sidewall 221 and the first top plate side 227A can cooperatively define a third recess 241B that extends inwardly from the first exterior sidewall and downward from the first top plate side. This third recess can be bounded by a third bottom wall 243C having a recess wall extending from the third bottom wall to the first top plate side as described above. The third bottom wall also can include a third bottom wall upper surface that faces upward into the third recess, and a third bottom wall lower surface 241BL that faces downward, under the third recess 241B.

As shown in FIGS. 9 and 10, the second exterior sidewall 222 and the second top plate side 227B cooperatively can define a fourth recess 242B that extends inwardly from the second exterior sidewall and downward from the second top plate side. That recess can be bounded by a fourth bottom wall 243D and a fourth recess wall extending from the fourth bottom wall to the second top plate side. The fourth bottom wall 243D can include a fourth bottom wall upper surface that faces upward into the fourth recess, and a fourth bottom wall lower surface 242BL that faces downward, under the fourth recess 242B. The third bottom wall lower surface 241BL can be separated by a second span S2 from the fourth bottom wall lower surface 242BL. This span can be similar to the first span and can extend across the longitudinal axis LA from the first side FS to the second side SS, generally traversing the bending region 228 of the ridge vent.

With further reference to FIG. 10, the plurality of first recesses 241 on the first side FS and the plurality of second recesses 242 on the second side SS can each be separated by distances on those respective sides. For example, the first bottom wall lower surface 241AL can be separated by a first distance D8 from the third bottom wall lower surface 241BL. The second bottom wall lower surface 242AL can be separated by a second distance D9 from the fourth bottom wall lower surface 242BL, and so on. These distances D8, D9 optionally can be greater than the spans S1, S2, etc.

As mentioned above, the filter membrane 250 can be joined with the body 223 of the ridge vent 220. FIG. 9 shows the filter membrane being placed and readied for installation relative to the body 223. FIG. 10 shows the filter membrane 250 joined with the ridge vent body 223. The joining of the filter membrane 250 to the body 223 of the ridge vent 220 can be facilitated by securing the filter membrane to the bottom walls and/or lower surfaces of the plurality of first recesses 241 and plurality of second recesses 242 on opposite sides of the longitudinal axis LA. The bottom wall lower surfaces of the respective recesses can facilitate this connection and can provide an architecture and spacing of the filter membrane relative to the top plate 227 and other components such that airflow can be promoted and or generally not impaired through the filter membrane, and relative to the ventilation elements of the respective sidewalls and/or the recesses when included in those recesses.

As described above, the filter membrane can include a first side edge 251E and a first side margin 251M, as well as a second side edge 252E and a second side margin 252M. The first side margin 251M can be bonded to one or more of the bottom wall lower surfaces of the first plurality of recesses 241 and the first side FS. For example, the first side margin 251M can be bonded to the first bottom wall lower surface 241AL of the first recess 241A and generally to the bottom wall of that recess. Likewise, the first side margin 251M can be bonded to the bottom wall lower surface 241BL of the third recess 241B and generally to the bottom wall of that recess. On the second side SS of the longitudinal axis LA, the second side margin 252M can be bonded to the second bottom wall lower surface 242AL of the second recess 242A and generally to the bottom wall of that recess. Likewise, the second side margin 252M can be bonded to the bottom wall lower surface 242BL of the fourth recess 242B and generally to the bottom wall of that recess. This bonding of the filter membrane can continue along the various additional first 241 and second 242 recesses along the sidewalls of the body 223. Optionally, the filter membrane 250 is not bonded to any portion of the top plate 227 or any other part of the body 223 besides the bottom walls of the recess.

As mentioned above, the filter membrane can be bonded to the body 223. This bonding can be achieved by gluing, cementing, adhering, fusing, melting, sonic welding, heat welding, fastening with a fastener, or otherwise securing the filter membrane to the respective bottom walls and/or bottom wall lower surfaces. Optionally, in one embodiment, the bonding can be performed by welding the filter membrane to the bottom wall and/or bottom wall lower surfaces as shown in FIG. 10. There, the filter membrane can be bonded to the bottom walls at exemplary bond regions 255 and 256, which are exemplary. At those bonded regions, the material of the filter membrane can be physically and chemically bonded to the bottom wall in particular the bottom wall lower surfaces 241AL and 241BL and more generally to the bottom walls of the respective recesses 241A and 241B. The bond regions 255 and 256 can be generally of a circular or rounded shape, and can be related to and/or can correspond to the shape of a heated welding element that can be pressed down upon the filter membrane while it is disposed directly over the bottom walls of the recesses 241A and 241B. In some cases, the material of the body 223 and of the bottom walls of the recesses can be constructed from a polymer material. The filter membrane can be constructed from a woven or nonwoven plurality of strands, filaments and/or fibers. The polymeric material of the bottom wall lower surfaces can partially melt and become embedded in the interstitial spaces between the respective strands, filaments and/or fibers of the filter membrane. Optionally, the melted polymeric material of the bottom wall lower surfaces of the body in general can fill the interstitial spaces and can extend around one or more of the strands, filaments and or fibers of the filter membrane. In some cases, some of the strands, filaments and/or fibers the filter membrane can melt, optionally with or without the polymeric material of the body 223, and can provide a physical and chemical bond between these elements.

Although shown as circular or rounded areas, the bond regions 255 and 256 can vary in shape and can be instead polygonal, elliptical or other shapes depending on the welding implement use to create the bond. As mentioned above, in some cases the filter membrane can simply be adhered to the bottom walls, for example, to the bottom wall lower surfaces of the respective first and second recesses 241, 242 on opposite sides of longitudinal axis. The adhesive, glue, cement or other bonding material can be applied initially to the filter membrane and/or to the bottom wall lower surfaces of the recesses. Subsequently, the filter membrane can be brought into direct engagement with the adhesive applied to join the filter membrane to the body 223. In other cases, the filter membrane can include a self-sticking adhesive, and can have a release liner that can be removed in certain areas along the filter membrane and/or from the entire filter membrane. The filter membrane can be stuck in place, contacting the bottom walls of the respective first and second recesses. A variety of other ways to join the filter membrane and the body 223 are contemplated herein.

Further optionally, when the filter membrane is joined with the body, for example, by bonding the filter membrane to the body 223, the filter membrane can be free from attachment to the top plate, the first sidewall and the second sidewall, as well as any of the recess side walls. For example, the filter membrane can be free from attachment across the respective spans S1 and S2 etc., between the first recesses 241 on one side FS and between the second recesses 242 on the opposite side of the longitudinal axis. As shown in FIG. 11, the filter membrane 250 can be joined with a first bottom wall lower surface 241AL and can extend across the first span S1 to the second bottom wall lower surface 241BL to which the filter membrane 250 is joined as well, for example, by bonding the filter membrane to that bottom surface. The filter membrane is joined with the body 223 and extends across the first span S1 and across the longitudinal axis LA from the first side FS to the second side SS.

The filter membrane 250 can be joined with the body 223, and in particular the bottom wall lower surfaces, or generally the bottoms of the respective first and second recesses on the first and second sides of the longitudinal axis in a similar manner. For example, with reference to FIG. 10, the filter membrane 250 can be joined at the side margin 251M with the third bottom wall lower surface 241BL and can extend across the second span S2 and across longitudinal axis LA from the first side FS to the second side SS to the fourth bottom wall lower surface 242BL. The filter membrane also can be joined, for example, by bonding to the fourth bottom wall lower surface 242BL. In addition, with reference to FIG. 10, it will be appreciated that the filter membrane can be joined with multiple first recesses 241 on the first side FS and multiple second recesses 242 on the second side SS. For example, the filter membrane 250 on the first margin 251M can extend across the first distance D8 and can be joined with the first bottom wall lower surface 241AL and the third bottom wall lower surface 241BL. On the second side SS, the filter membrane and the second margin 252M can extend across the second distance D9 on the second side SS of longitudinal axis and can be joined with the second bottom wall lower surface 242AL and the fourth bottom wall lower surface 242BL.

In each of the respective spans S1 and S2 and distances D1 and D2, the filter membrane 250 can be suspended distal from the top plate 227 and the respective top plate sides 227A and 227B. For example, between the recesses 241A and 242A shown in FIG. 11, the filter membrane 250 extending through the span S1 in a free-floating form can be separated from the top plate 227 by height H1. This height H1 optionally can be optionally about ⅛ inch to about 3 inches, about ¼ inch to about 2½ inches, about ½ inch to about 2 inches, about 1 inch to about 1½ inches, or other distances depending on the application and proposed air flow through the ridge vent 220.

Optionally, the height H1 can vary depending on the orientation of the top plate first side 227A and the top plate second side 227B. As shown in FIG. 11, those plates can be at an angle A3 relative to one another. This angle can optionally be 0° to 30°, inclusive, 1° to 15°, inclusive, 1° to 10°, inclusive, or other angles depending on the application. Where the angle A1 is greater, in some cases, the filter membrane 250 within the span S1 can sag farther away from the top plate first side 227A and the top plate second side 227B such that the height H1 is greater than it would be in another configuration that is flatter or more planar or where the angle A3 is closer to zero.

With further reference to FIG. 11, a void 227V can be formed between the top plate 227 and the filter membrane 250 with in the span S1, as well as the other spans S2 and distances D8, D9, etc. between opposing recesses on opposite sides of longitudinal axis LA. Generally, the void 227V can be formed between the top plate and the filter membrane around the first plurality of recesses 241 and the second plurality of recesses 242 on the first side FS and on the second side SS of the ridge vent. This void 227V can be separated from the actual recesses 241 and 242 by the respective recess sidewalls, for example 245A and 245B. Of course, the void 227V can be in fluid communication with those recesses via any ventilation elements defined in the recess sidewalls. Indeed, airflow AF can occur through the filter membrane 250, through the void 227V, through the recesses and/or exterior sidewalls 221, 222 and out the respective ridge vent 220 into the environment as shown in FIG. 11.

As also shown in FIG. 11, the void 227V can be formed between the respective planes P1 and P2 of the top plate 227 and the filter membrane 250. The top plate can lay in the first plane P1 above the first bottom wall lower surface 241AL and the second bottom wall lower surface 241BL. The plane P1 as shown can optionally be at angle A3 relative to a third plane P3 on the second side of the top plate or on the second side of the longitudinal axis. The filter membrane can lay in the second plane P2 on both sides of the axis. The void 227V can be formed between the first plane P1 and the second plane P2. Again this void can be formed around the first recess 241A and the second recess 242A, as well as any other first and second recesses on the first and second sides longitudinal axis. The respective recess sidewalls and bottom walls can separate the recesses from that void 227V.

In operation, the filter membrane 250 can be operable in different modes after being joined with the body 223. For example, the filter membrane 250 can be operable in a slack mode shown in FIG. 11 and a taut mode shown in FIG. 12. Optionally, the slack mode can be achieved when the ridge vent 220 is uninstalled relative to roof surfaces 101S and 102S between which an opening 103 is formed at a roof ridge 104. The roof surfaces shown in FIG. 12 can be identical to the roof surfaces shown in FIG. 5. When the filter membrane is in the slack mode shown in FIG. 11, the filter membrane 250 can be under minimal or zero tension T7 within the first span S1, and any other spans, such as S2, between respective first and second recesses on opposite sides longitudinal axis along the length of the ridge vent. Again, the slack mode can be achieved before the ridge vent is installed relative to a roof ridge.

Figure 12:
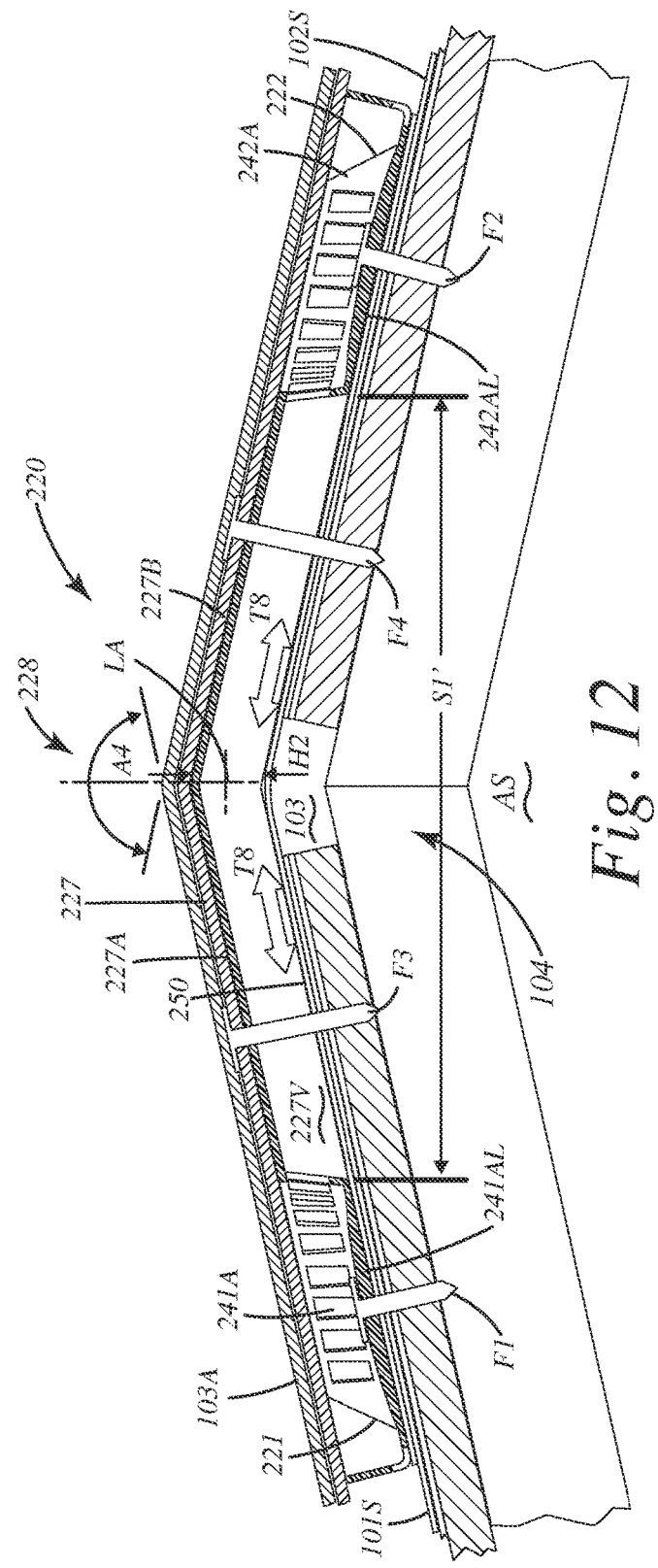
FIG. 12 is a partial section view of the ridge vent in a system where the ridge vent is secured to first and second roof surfaces of a building with fasteners, and with the filter membrane in a taut mode.

The filter membrane 250 can be operable in the taut mode, shown in FIG. 12 in which the filter membrane 250 is under tension T8 within the first span S1 when the ridge vent is installed relative to the roof ridge and joined with the respective roof surfaces 101S and 102S, which are angled relative to one another and on opposite sides of the opening 103 at the roof ridge or roof peak 104. Optionally, the tension T8 is greater than the tension T7. When the ridge vent 220 is installed, the tension therein transverse to the longitudinal axis LA can increase from tension T7, which in some cases can be zero, to an increased tension T8, which can be greater than zero, or generally greater than tension T7 preinstallation. As described below, the tension T8 can be maintained in the filter membrane 250 across the spans S1, S2, etc. via fasteners installed through the roof ridge vent 220 into the groove surfaces 101S and 102S.

Further optionally, in cases where the filter membrane 250 is elastic in one or more directions, and/or is elastic across the spans S1, S2, etc., the filter membrane 250 can actually increase in its overall length or width transverse to the axis LA, across the span S1, S2, etc. when the ridge vent 220 is installed relative to the roof surfaces 101S and 102S. Again, this can be due to the filter membrane 250 between the bottom surfaces 241AL and 242AL stretching and becoming slightly longer upon installation of the ridge vent 220 relative to the ridge 104.

Further optionally, when the ridge vent 220 is installed relative to the roof surfaces 101S, 102S, the height H1, shown in FIG. 11 can change. For example, FIG. 11 shows the ridge vent 220 before it is installed relative to roof surfaces. FIG. 12 shows the ridge vent 220 installed relative to roof surfaces 101S, 102S that are an angle A4 relative to one another. When this occurs, the angle A3 in FIG. 11 can increase to the angle A4. Optionally, the filter membrane 250 is also pushed slightly upward toward the top plate 227 within the span S1, S2, etc. As this occurs, the height H1 decreases to a lesser height H2. In some cases, the height H1 can decrease optionally by ⅛ inch, ¼ inch, ½ inch, 1 inch, 1½ inch or other distances depending on the configuration of the roof and the elasticity of the filter membrane 250. Optionally, the first height H1 is greater than the second height, after installation of the ridge vent 220 relative to the roof surfaces.

Referring further to FIG. 12, the ridge vent 220 can be installed as part of the ridge vent system for a roof of a building. As shown there, the ridge vent 220 can be installed relative to the roof surfaces 101S and 102S via one or more fasteners F1 and F2. The first fasteners F1 can project through a respective bottom wall 241AL of a first recess 241A, or any other first recesses along the first side. The first fastener F1 also can penetrate and project through the filter membrane 250 and into the roof surface 101S to secure the first top plate side 227A to the first roof surface 101S. Where the filter membrane is penetrated by a fastener, it is operable in a penetration mode in which the fasteners F1, F2 projects through a respective first bottom wall, filter membrane, and into an underlying substrate, for example, a roof surface, to secure the ridge vent 220 to that underlying substrate.

The second fasteners F2 can project through a respective bottom wall 241BL of the second recess 242A, or any other second recesses along the second side SS. The second fasteners F2 also can penetrate or project through the filter membrane 250 and into the roof surface 102S. In turn, the fasteners can secure the second top plate side 227B to the second roof surface 102S. As a result, the angle A3 in the preinstalled state of the roof ridge vent can increase to a second angle A4 shown in FIG. 12. This angle A4 can correspond to the angles of the first top plate side of the second top plate side described in connection with the embodiments above. The first top plate side 227A and the second top plate side 227B also can bend in the bending region 228 upon installation of the fasteners F1 and F2.

Optionally, after the ridge vent is installed via the first fasteners F1 and F2 on the first FS and second SS sides of the longitudinal axis LA, cover shingle 103C1 can be placed over the top plate 227 covering the first top plate side and the second top plate side. The shingle can extend from the first exterior side wall 221 to the second exterior side wall 222 and beyond the same. It also can cover the first recesses 241 and the second recesses 242 on opposite sides of the longitudinal axis and the bending region of the body of the ridge vent. The shingle can bend to an angle A4. To secure the shingle, one or more third fasteners F3 can be advanced and installed to project through the shingle, through the first top plate side 227A, through the filter membrane 250 and into the first roof surface 101S to secure the shingle over the top plate. The third fasteners F3 can be distal from any of the plurality of the first recesses 241, and located generally between the first recess sidewall and the bending region of the top plate. The fourth fastener F4 likewise can be projected and advanced through the shingle 103C1, through the second top plate side 227B, through the filter membrane 250 and into the second roof surface 102S to secure the shingle over the top plate. The fourth fastener F4 can be distal from any of the plurality of second recesses 242, and located generally between the second recess sidewall and the bending region of the top plate. Additional cover shingles can be installed over the first shingle 103C1 and the respective, similar fasteners F3 and F4 in a repeating manner along the roof ridge 104. Further, additional ridge vents can be installed adjacent the ridge vent 220 as with the current embodiment described above to complete the ridge vent system across a roof ridge.

Figure 13:
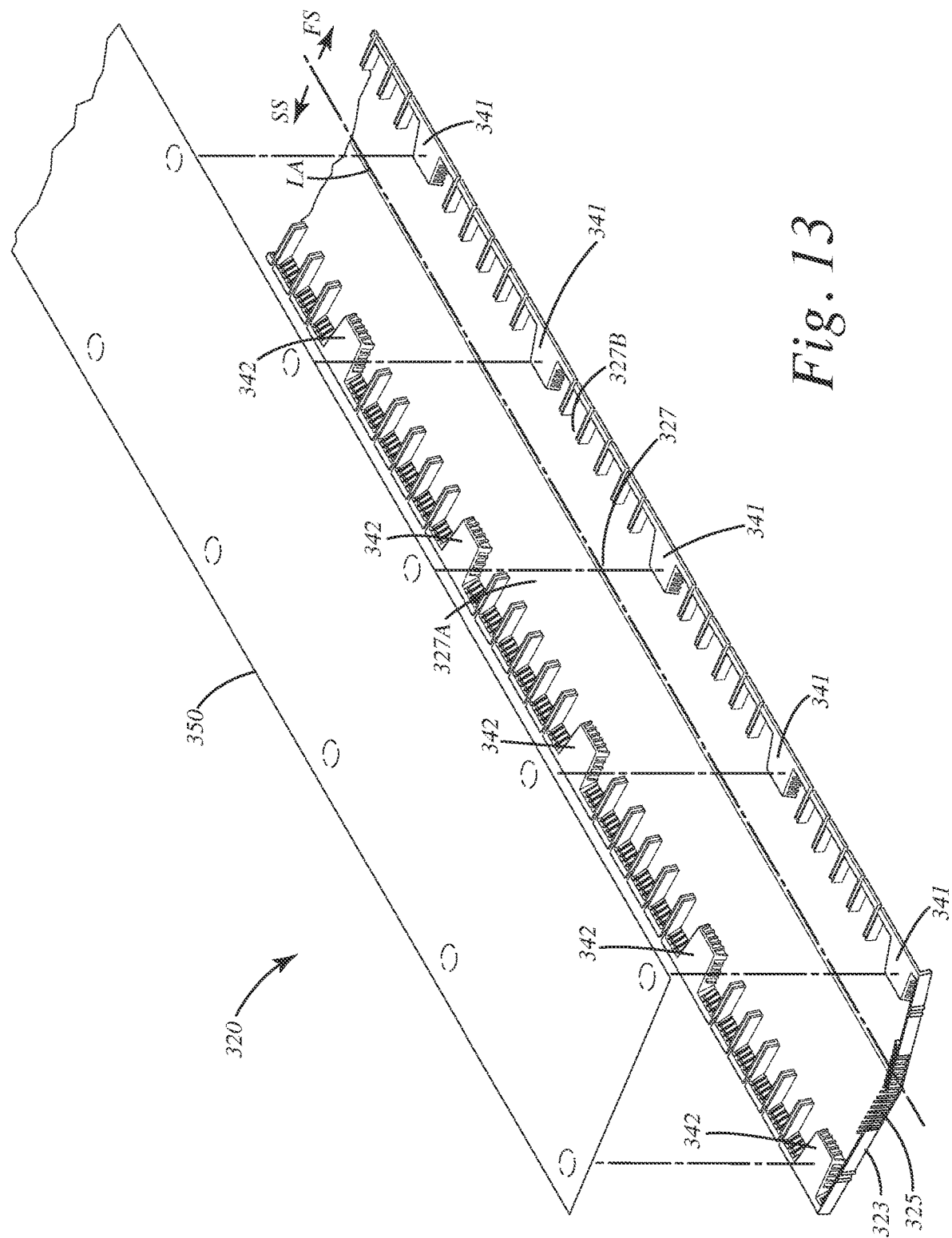
FIG. 13 is a bottom perspective view of a ridge vent of a third alternative embodiment having a filter membrane before being joined with an elongated body of the ridge vent.
Figure 14:
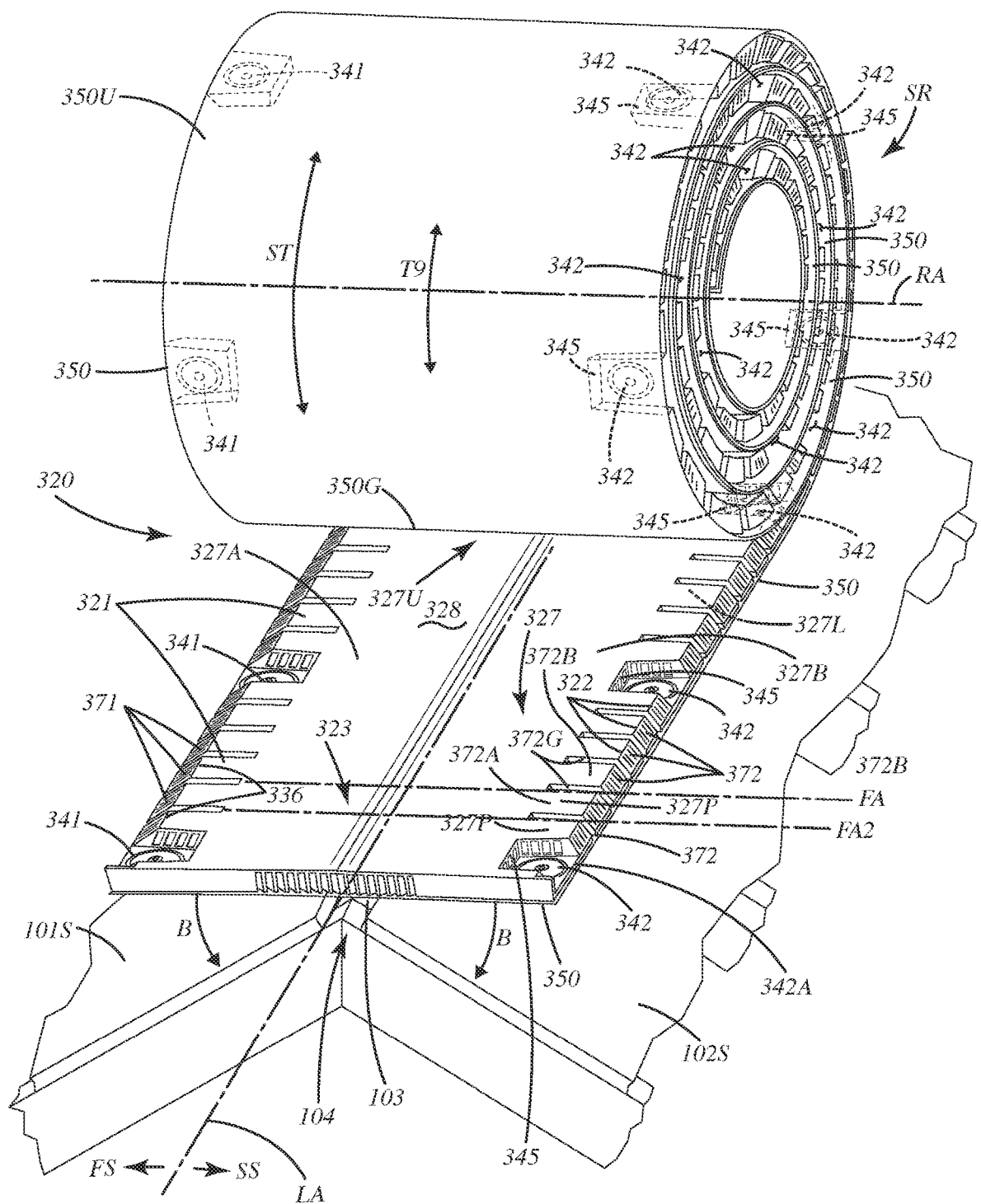
FIG. 14 is a top perspective view of the ridge vent in a rolled mode wherein the ridge vent is rolled upon itself in layers in a spiral roll.

A third alternative embodiment of the ridge vent is illustrated in FIGS. 13 and 14 and generally designated 320. This embodiment is virtually identical in structure, function and operation to the embodiment of the ridge vents 220, 120 and 20 described above with several exceptions. For example, in this embodiment, the ridge vent 320 can include a first plurality of recesses 341 and a first side FS of longitudinal axis LA, and a second plurality of recesses 342 on a second side SS of the longitudinal axis LA. The recesses can be designed, configured and sized such that a foot of a nail gun, a screw gun and/or a staple gun can fit within the recess to advance a fastener, such as a screw or a nail into a nailing flange thereof. Each of the recesses can be identical to the recesses described in the embodiments above. Each of the recesses can include respective bottom walls, along with bottom wall surfaces to which a filter membrane 350 is joined. Generally, the filter membrane 350 can be joined with the body 323 similar to the embodiments above. The filter membrane also can be elastic and/or compliant and able to stretch in one or more directions as described below. The respective sidewalls and/or recesses can include ventilation elements similar or identical to the ventilation elements described in connection with the embodiments above.

Further, the body 323 can include a top plate 327 extending from the first side S1 to the second side S2. This top plate 327 can include a first top plate side 327A and a second top plate side 327B. These first and second top plate sides can be generally planar plates and can be joined across the longitudinal axis LA via a bending region 328, similar or identical to the embodiments above. The bending region 328 can be an area of flexibility and/or resilience allowing the bending region to bend, flex or otherwise provide angular and/or other movement between the first top plate side and the second top plate side. As a result, the first top plate side and the second top plate side can move and change angular orientation relative to one another, like the embodiments above and below.

As mentioned above, the filter membrane 350 also can be joined with the body 323 of the ridge vent 320 and a similar manner. When installed relative to a roof, the filter membrane can be disposed a distance from the top plate, and can stretch from a slack mode to a top mode as described in connection with the embodiment above with reference to FIGS. 11 and 12. Accordingly, the structure, operation, relative movement and other parameters with regard to the same will not be described again here.

In this embodiment however, the ridge vent 320 can be constructed such that the body 323 is an elongated body that is flexible and operable in a rolled mode in which the elongated body is rolled lengthwise in a spiral roll SR, shown in FIG. 14 before and/or during installation relative to a roof ridge 104. The elongated body 323 of the ridge vent 320 also is operable in an unrolled mode, shown partially in FIG. 14 as well when being installed relative to roof surfaces 101S and 102S over an opening 103 between the same on the ridge 104.

Optionally, the ridge vent can have a structure similar to that shown in the second embodiment in FIGS. 9-10 but can be elongated such that the body 223 is significantly longer. In some cases, the ridge vent 320 can be greater than 4 feet, greater than 5 feet, greater than 6 feet, greater than 7 feet, greater than 8 feet, greater than 9 feet, greater than 10 feet or greater lengths depending on the application. In such a construction, the body 223 can be constructed from a flexible, more resilient material that may or may not be elastic and/or compliant so that it can easily be rolled upon itself in a spiral roll SR.

As shown in FIG. 14, the ridge vent 320 can be structured to include multiple first and second segments 371 and 372 disposed on opposite sides FS and SS of the longitudinal axis. These segments 371 and 372 can each include a portion of a top plate, a portion of a respective side wall 321 or 322 and an optional lip or outer wall (not shown, but similar to wall 37 or lip 36 in the embodiment above), if included, any of which can include ventilation elements, such as slots or other structures as described in the embodiments above. Each of the segments, however, can be separated by a gap to allow the segments to flex and bend relative to one another along with the top plate 327. For example, as shown in FIG. 14, the segments 372A and 372B on one side of the longitudinal axis LA can be separated by a gap 372G. Each of the respective segments can be separated such that the portion of the top plate 327P associated with the segments can flex and bend independently relative to one another and about a flexing axis FA. This again can allow the segments to bend relative to one another along the length of the ridge vent.

Further optionally, each of the respective recesses 341 and 342 on opposing sides of longitudinal axis LA can also flex and bend relative to each of the segments 371, 372. For example, as again shown in FIG. 14, the recess 342A can be separated by a gap 372K relative to a segment 372A. This can enable that recess 342A to be separated from, and independently flexible relative to, the segment 372A and the top plate portion 327P of that segment. The recess 342A can dynamically flex about or relative to a flexing axis FA2 relative to the segment 372A and/or the segment 372B as well as any other segments 372 along the first side. These flexing axes FA and FA2 can be transverse to the longitudinal axis LA, and further optionally can be perpendicular relative to that axis. It will be noted that these flexing axes need not necessarily be a perfect linear axes, but instead can be a flexing region of the top plate generally about or near the respective, illustrated flexing axes. Again, this can allow the different segments and recesses to flex and bend relative to one another when rolled into a roll as shown in FIG. 14.

Optionally, the configurations of the sidewalls 321 and 322, and any other components can be modified from the embodiments above to allow the rolling of the body 323 into a spiral roll SR. For example, although not shown, the exterior sidewalls 321, 322 can be of an undulating wavy form along the length of the body. In other cases, the sidewalls can be void of a lower edge, and instead can be comprised of multiple small plates, pins or posts that extend downward from the top plate 327 along the outer edges of the top plate between the respective recesses 341 and 342 on opposite sides of longitudinal axis. These plates, pins or posts can be disposed in an array generally between the recesses on the respective first FS and second SS sides of the longitudinal axis LA. Alternatively, the plates, pins or posts can be disposed randomly across the entire bottom surface of the top plate 327, generally between each of the respective recesses. Each of the plates, pins or posts can extend downwardly in a cantilevered manner and terminate at a free end distal from the bottom of the top plate. The recesses 341 and 342 can be disposed along the outer edges of the top plate having those downwardly depending plates, pins or posts between the recesses.

As mentioned above, the ridge vent 320 can be initially in a rolled form. FIG. 14 shows a portion of the ridge vent 220 where the elongated body 323 is at least partially in the rolled mode. In particular, the ridge vent body 323 is shown in a spiral roll SR at one end. When in this mode, the spiral roll can include a roll axis RA about which the body can be rolled in a spiral form. In this form, the body 323 and filter membrane 350 joined with the body can be rolled over and over in layers. When the ridge vent 320, in particular, the elongated body 323, is in this rolled mode, and generally in a spiral roll SR, as can be seen in FIG. 14, each of the respective recess walls 345 can be visible within each of the recesses 342 from a side view of the spiral roll SR. In this configuration, the various recesses 342 and the respective bottom wall lower surfaces of each can be layered outward away from the roll axis RA. In this configuration, each of the bottom wall lower surfaces of the respective recesses 342 can be disposed radially outward from another bottom wall lower surface of an another layer of the body that is closer to the roll axis RA. Likewise, the various segments 371 and 372 can be rolled upon one another and disposed in various layers emanating from the roll axis RA.

Optionally, the respective recesses 342 are sandwiched between a segment 372 in one layer closer to the roll axis RA than the recess, and another segment of a second layer farther away from the roll axis RA than the recess 342. The recesses 342 on one side of the spiral roll SR can be layered one above the other in the spiral roll SR when the elongated body 323 is in the rolled mode. Although not shown, the recesses 341 also can be layered one above the other in the spiral roll SR in different layers when the elongated body 323 is in the rolled mode. Generally, the recesses 341 and the respective recess walls thereof on the other side of longitudinal axis also can be visible in a similar, stacked or layered manner on the opposite side of the spiral roll SR.

When the elongated body 323 of the ridge vent 320 is rolled in the spiral roll SR, the filter membrane 250 can be rolled over upon and can engage certain portions of the top plate. For example, as shown in FIG. 14, the filter membrane 350 can be spaced from the lower surface 327L of the top plate 327, for example, by a height H1 or H2 of the embodiment as shown in FIGS. 11 and 12. On the other hand, when the ridge vent 320 is rolled over upon itself, the upper surface or portion 327U of the top plate 327 can engage the filter membrane portion 350C such that the top plate is in direct engagement with a filter membrane of another layer of the spiral roll SR. Generally, the filter membrane 250 can be spaced from the first portion, such as a lower surface 327AL of the top plate in the rolled mode, but can engage a second portion, such as an upper surface 327U of the top plate in the rolled mode when the ridge vent is in the spiral roll SR.

As mentioned above, the filter membrane 350 can be constructed to be elastic, optionally lengthwise along the elongated body 323. Accordingly, the filter membrane 350 can stretch in direction ST as shown in FIG. 14. When it stretches in direction ST, the filter membrane 350 optionally can be placed under tension T9. The tension T9 can be exerted generally parallel to the longitudinal axis LA of the ridge vent 220, or generally circumferentially around the roll axis RA. By allowing the filter membrane to stretch as shown, this can facilitate the rolling of the ridge vent into the rolled mode shown there. In some cases, this also can assist in directing the segments 371, 372 into a layered configuration about the roll axis RA.

A method of installing the ridge vent 320 of the embodiments shown in FIGS. 12-13 will now be described. The method generally can include providing the ridge vent 320 in a rolled mode, placing the ridge vent over a roof ridge 104 over an opening 103 so that the top plate sides 327A and 327B overlap a respective roof surfaces 101S and 102S. The top plate can be bent along the bending region 328 so that such that the first top plate side 327A and the second top plate side 327B become aligned with or in some cases parallel to the respective first and second surfaces 101S and 102S. The ridge vent can be further unrolled or only partially unrolled from the spiral roll SR before advancing first fasteners, second fasteners, third fasteners and fourth fasteners in a manner similar to those described in connection with the embodiment above in FIG. 12 while the elongated body is in the unrolled mode. This in turn, fastens the ridge vent 320 to the roof ridge 104 and more specifically to the respective roof surfaces 101S and 102S. Additional shingles can be placed over the top plate to cover the respective recesses on opposite sides of the bending region and longitudinal axis as described in connection with the embodiments above. Again, the additional fasteners can secure that shingle to the ridge vent and additional shingles can be placed over that shingle and over the ridge vent to complete the system installation relative to the roof ridge 104. As with the embodiment shown in FIGS. 11 and 12, the filter membrane 350 also can stretch and change its height relative to the top plate upon installation. The filter membrane 350 also can transition from a slack mode to a taut mode like the embodiment shown there, which will not be described again here. Multiple rolls of ridge vent can be installed in a similar manner across the roof ridge 104 to cover the opening and complete the roofing system on the roofing surfaces.

The following additional Statements illustrate further embodiments, the numbering of which is not to be construed as designating levels of importance. Moreover, it is to be understood that the Statements of embodiments recited below are provided in conjunction with and in addition to the embodiments described above, as well as those claimed even farther below. Alternative embodiments that result from combining, integrating, and/or omitting features of the embodiments of the Statements below or any other embodiment described herein may also be within the scope of the present invention.

Statement A: A ridge vent for a roof of a building, the ridge vent comprising: a body including a first end, a second end opposite the first end, a first side, a second side opposite the first side, and a longitudinal axis; a top plate extending from the first side toward the second side and including first top plate side, a second top plate side and a bending region between the first top plate side and the second top plate side, the bending region overlapping the longitudinal axis and configured so that the first top plate side and the second top plate side can move and change an angular orientation relative to one another; a first exterior sidewall extending downward from the top plate on the first side, the first exterior sidewall being angled downward from the top plate, the first exterior sidewall defining a first plurality of slots and a second plurality of slots, the first exterior sidewall and the first top plate side cooperatively defining a first recess that extends inwardly from the first exterior sidewall and downward from the first top plate side, the first recess being bounded by a first bottom wall and a first recess wall extending from the first bottom wall to the first top plate side, the first recess wall defining a third plurality of slots between the first bottom wall and the first top plate side, the third plurality of slots being located between the first plurality of slots and the second plurality of slots to provide a first contiguous vented area along the first exterior sidewall and the first recess wall, the first recess wall extending along a curved path inward from the first exterior sidewall, with the third plurality of slots following the curved path to provide a first venting area around the first recess that is curvilinear.

Statement B: The ridge vent of Statement A comprising a first target region in the first recess delimited by an indicia element whereby a user can identify a location in the first target region to install a fastener through the first target region.

Statement C: The ridge vent of any preceding Statement wherein the first, second and third plurality of slots form the first contiguous vented area that has a first venting length longer than a length of the body taken along the longitudinal axis.

Statement D: The ridge vent of any preceding Statement wherein the first recess wall includes a curvilinear portion nearest the longitudinal axis that transitions to first and second linear portions nearest the first sidewall.

Statement E: The ridge vent of any preceding Statement wherein the first target region spans a width between the first and second linear portions across the first floor.

Statement F: The ridge vent of any preceding Statement wherein the first target region includes a dome shape of a first thickness greater than a second thickness of a first remaining portion.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an article, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A ridge vent for a roof of a building, the ridge vent comprising:
    an elongated body including a first end, a second end opposite the first end, a first side, a second side opposite the first side, a longitudinal axis;
    a top plate extending from the first side toward the second side and including a first top plate side, a second top plate side and a bending region between the first top plate side and the second top plate side, the bending region overlapping the longitudinal axis and configured so that the first top plate side and the second top plate side can move and change an angular orientation relative to one another;
    a first exterior sidewall extending downward from the top plate on the first side, the first exterior sidewall including first ventilation elements, the first exterior sidewall and the first top plate side cooperatively defining a first recess, the first recess being bounded by a first bottom wall and a first recess wall extending from the first bottom wall to the first top plate side, the first bottom wall including a first bottom wall upper surface that faces upward into the first recess, and a first bottom wall lower surface that faces downward, under the first recess; and a second exterior sidewall extending downward from the top plate on the second side, the second exterior sidewall including second ventilation elements, the second exterior sidewall and the second top plate side cooperatively defining a second recess, the second recess being bounded by a second bottom wall and a second recess wall extending from the second bottom wall to the second top plate side, the second bottom wall including a second bottom wall upper surface that faces upward into the second recess, and a second bottom wall lower surface that faces downward, under the second recess, the second bottom wall lower surface separated by a first span from the first bottom wall lower surface, wherein the elongated body is flexible and operable in a rolled mode in which the elongated body is rolled lengthwise in a spiral roll before installation relative to a roof ridge, wherein the elongated body is operable in an unrolled mode in which the elongated body is unrolled lengthwise during installation relative to a roof ridge, wherein the elongated body comprises:
a plurality of first segments disposed on a first side of the longitudinal axis and separated from each other by gaps, wherein a portion of the top plate is associated with each of the plurality of first segments; and a plurality of second segments disposed on a second side of the longitudinal axis and separated from each other by gaps, wherein a portion of the top plate is associated with each of the plurality of second segments, wherein the gaps allow the plurality of first and second segments to flex and bend relative to one another along with the top plate to facilitate rolling the ridge vent in a spiral roll.

2. The ridge vent of claim 1, comprising:
a filter membrane joined with the first bottom wall lower surface and extending across the first span and across the longitudinal axis to the second bottom wall lower surface, to which the filter membrane is joined, wherein the filter membrane is rolled with the elongated body in the spiral roll before installation relative to a roof ridge when the elongated body is in the rolled mode, wherein a filter membrane lower surface engages the top plate in the spiral roll.

3. The ridge vent of claim 2,
wherein the filter membrane is operable in a slack mode in which the filter membrane is under no tension within the first span between the first recess and the second recess before the ridge vent is installed relative to the roof ridge, wherein the filter membrane is operable in a taut mode in which the filter membrane is under tension within the first span between the first recess and the second recess when the ridge vent is installed relative to the roof ridge.

4. The ridge vent of claim 2,
wherein the filter membrane is air permeable and in a form of a two-dimensional flat sheet, wherein the filter membrane is free from attachment to the top plate, the first exterior sidewall and the second exterior sidewall between the first recess and the second recess on opposite sides of the longitudinal axis, wherein the filter membrane is secured to the first bottom wall lower surface and the second bottom wall lower surface and spans across a void therebetween under the top plate.

5. The ridge vent of claim 1,
wherein the first ventilation elements are in the form of a first plurality of slots,
wherein the second ventilation elements are in the form of a second plurality of slots,
wherein the first recess wall and second recess wall each include recess ventilation elements.

6. The ridge vent of claim 1,
wherein the elongated body includes a plurality of segments,
wherein a portion of the top plate is associated with each of the plurality of segments, and
wherein the plurality of segments are separated such that the portion of the top plate associated with each of the plurality of segments can flex and bend independently relative to one another and about a flexing axis to facilitate rolling the ridge vent in a spiral roll.

7. The ridge vent of claim 1, wherein the portions of the top plate associated with each of the plurality of first and second segments can flex and bend independently relative to one another and bend about a flexing axis that is perpendicular to the longitudinal axis to facilitate rolling the ridge vent in a spiral roll.

8. A ridge vent for a roof of a building, the ridge vent comprising:
an elongated body including a first end, a second end opposite the first end, a first side, a second side opposite the first side, and a longitudinal axis;

a top plate extending from the first side to the second side and including a including a first top plate side and a second top plate side;

a first exterior sidewall extending downward from the top plate on the first side, the first exterior sidewall defining a first plurality of ventilation elements, the first exterior sidewall and the first top plate side cooperatively defining a plurality of first recesses each bounded by a first bottom wall including a first bottom wall upper surface that faces upward into a respective first recess, and a first bottom wall lower surface that faces downward, under the respective first recess and distal from the top plate on the first side; and a second exterior sidewall extending downward from the top plate on the second side, the second exterior sidewall defining a second plurality of ventilation elements, the second exterior sidewall and the second top plate side cooperatively defining a plurality of second recesses each bounded by a second bottom wall including a second bottom wall upper surface that faces upward into a respective second recess, and a second bottom wall lower surface that faces downward, under the respective second recess and distal from the top plate on the second side, each second bottom wall lower surface separated by a first span from each first bottom wall lower surface, wherein the elongated body is flexible and operable in a rolled mode in which the elongated body is rolled lengthwise in a spiral roll before installation relative to a roof ridge, wherein the elongated body is operable in an unrolled mode in which the elongated body is unrolled lengthwise during installation relative to a roof ridge;

wherein the elongated body comprises:
a plurality of first segments disposed on a first side of the longitudinal axis and separated from each other by gaps, wherein a portion of the top plate is associated with each of the plurality of first segments; and
a plurality of second segments disposed on a second side of the longitudinal axis and separated from each other by gaps, wherein a portion of the top plate is associated with each of the plurality of second segments,
wherein the gaps allow the plurality of first and second segments to flex and bend relative to one another along with the top plate to facilitate rolling the ridge vent in a spiral roll.

9. The ridge vent of claim 8, comprising:
a filter membrane joined with the first bottom wall lower surface and extending across the first span and across the longitudinal axis to the second bottom wall lower surface, to which the filter membrane is joined,
wherein the filter membrane is a sheet that is spaced a height from the top plate to form a void between the sheet and the top plate around the plurality of first recesses and the plurality of second recesses,
wherein the sheet is air permeable,
wherein the filter membrane is spaced from a first portion of the top plate in the rolled mode, but engages a second portion of the top plate in the rolled mode when in the spiral roll.

10. The ridge vent of claim 8 comprising:
wherein the plurality of first recesses are layered one above the other in the spiral roll when the elongated body is in the rolled mode,
wherein the spiral roll includes a roll axis,
wherein the first bottom wall lower surface of one layer is disposed radially outward from a first bottom wall lower surface of another layer closer to the roll axis.

11. The ridge vent of claim 8,
wherein each first recess is bounded by a first bottom wall and a first recess wall that extends from the first bottom wall to the first top plate side,
wherein each second recess is bounded by a second bottom wall and a second recess wall that extends from the second bottom wall to the second top plate side,
wherein each second recess wall is visible within each second recess from another side view of the spiral roll when the elongated body is in the rolled mode.

12. The ridge vent of claim 8,
wherein the elongated body includes a plurality of segments,
wherein a portion of the top plate is associated with each of the plurality of segments, and
wherein the plurality of segments are separated such that the portion of the top plate associated with each of the plurality of segments can flex and bend independently relative to one another and about a flexing axis to allow the ridge vent to roll into the spiral roll in the rolled mode.

13. The ridge vent of claim 8, wherein the portions of the top plate associated with each of the plurality of first and second segments can flex and bend independently relative to one another and bend about a flexing axis that is perpendicular to the longitudinal axis to facilitate rolling the ridge vent in a spiral roll.

14. A ridge vent for a roof of a building, the ridge vent comprising:
an elongated body including a first end, a second end opposite the first end, a first side, a second side opposite the first side, a longitudinal axis;
a top plate extending from the first side toward the second side and including a first top plate side, a second top plate side and a bending region between the first top plate side and the second top plate side, the bending region overlapping the longitudinal axis and configured so that the first top plate side and the second top plate side can move and change an angular orientation relative to one another;
a first exterior sidewall extending downward from the top plate on the first side, the first exterior sidewall including first ventilation elements, the first exterior sidewall and the first top plate side cooperatively defining a first recess, the first recess being bounded by a first bottom wall and a first recess wall extending from the first bottom wall to the first top plate side, the first bottom wall including a first bottom wall upper surface that faces upward into the first recess, and a first bottom wall lower surface that faces downward, under the first recess;
a second exterior sidewall extending downward from the top plate on the second side, the second exterior sidewall including second ventilation elements, the second exterior sidewall and the second top plate side cooperatively defining a second recess, the second recess being bounded by a second bottom wall and a second recess wall extending from the second bottom wall to the second top plate side, the second bottom wall including a second bottom wall upper surface that faces upward into the second recess, and a second bottom wall lower surface that faces downward, under the second recess, the second bottom wall lower surface separated by a first span from the first bottom wall lower surface; and
a filter membrane joined with the first bottom wall lower surface and extending across the first span and across the longitudinal axis to the second bottom wall lower surface, to which the filter membrane is joined,
wherein the elongated body is flexible and operable in a rolled mode in which the elongated body is rolled lengthwise in a spiral roll before installation relative to a roof ridge,
wherein the elongated body is operable in an unrolled mode in which the elongated body is unrolled lengthwise during installation relative to a roof ridge,
wherein the filter membrane is rolled with the elongated body in the spiral roll before installation relative to a roof ridge when the elongated body is in the rolled mode,
wherein a filter membrane lower surface engages the top plate in the spiral roll,
wherein the filter membrane is disposed a first height from the top plate along the longitudinal axis before the ridge vent is installed relative to a roof ridge,
wherein the filter membrane is disposed a second height from the top plate along the longitudinal axis when the ridge vent is installed relative to the roof ridge,
wherein the first height is greater than the second height.

* * * * *